US012565051B2

(12) United States Patent

Mano et al.

(10) Patent No.: US 12,565,051 B2
(45) Date of Patent: Mar. 3, 2026

(54) PRINTING APPARATUS FOR ADJUSTING POSITIONAL ACCURACY OF SENSORS

(71) Applicant: SEIKO EPSON CORPORATION, Tokyo (JP)

(72) Inventors: Kazuki Mano, Nagano (JP); Nobuaki Sakai, Shiojiri (JP); Ryota Takayanagi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 18/529,568

(22) Filed: Dec. 5, 2023

(65) Prior Publication Data

US 2024/0190151 A1 Jun. 13, 2024

(51) Int. Cl.

*B41J 29/02* (2006.01)
*B41J 11/00* (2006.01)
*B41J 11/06* (2006.01)
*B41J 13/10* (2006.01)

(52) U.S. Cl.

CPC ........... *B41J 29/02* (2013.01); *B41J 11/0095* (2013.01); *B41J 11/06* (2013.01); *B41J 13/10* (2013.01)

(58) Field of Classification Search

CPC ........ B41J 29/02; B41J 11/0095; B41J 13/10; B41J 11/06

See application file for complete search history.

(56) References Cited

U.S. PATENT DOCUMENTS

2015/0231902 A1* 8/2015 Ishizuka .............. B65H 23/042 347/16
2020/0276806 A1* 9/2020 Fujimaki .................. B41J 11/06
2022/0234346 A1 7/2022 Kobayashi

FOREIGN PATENT DOCUMENTS

JP 2022-115380 A 8/2022

* cited by examiner

*Primary Examiner* — Henok D Legesse

(74) *Attorney, Agent, or Firm* — WORKMAN NYDEGGER

(57) ABSTRACT

A printing apparatus including a medium support portion configured to support a medium, a head configured to eject ink onto the medium supported by the medium support portion, a first sensor configured to detect the medium supported by the medium support portion, a second sensor configured to detect the medium supported by the medium support portion, and a sensor attachment component to which the first sensor and the second sensor are attached, wherein the first sensor and the second sensor each include a light-projecting unit and a light-receiving unit facing each other with a space through which the medium support portion passes interposed therebetween, and the sensor attachment component is attachable and detachable with the first sensor and the second sensor attached.

14 Claims, 30 Drawing Sheets

PRINTING APPARATUS FOR ADJUSTING POSITIONAL ACCURACY OF SENSORS

The present application is based on, and claims priority from JP Application Serial Number 2022-195527, filed Dec. 7, 2022, the disclosure of which is hereby incorporated by reference herein in its entirety.

BACKGROUND

1. Technical Field

The present disclosure relates to a printing apparatus.

2. Related Art

JP 2022-115380 A discloses a printer in which a printing medium on a platen is detected by a first sensor and a second sensor. The printer is an example of a printing apparatus. When the printing medium is detected based on a detection result of the first sensor, the printer does not perform printing. This reduces a possibility of contact between the printing medium and a head that performs printing on the printing medium. When the printing medium is not detected based on a detection result of the second sensor, the printer does not perform printing. As a result, it is possible to suppress deterioration in print image quality due to separation between the head and the printing medium.

When a plurality of sensors are attached to one printing apparatus, it is difficult to adjust positional accuracy and posture accuracy among the plurality of sensors.

SUMMARY

A printing apparatus includes a medium support portion configured to support a medium, a head configured to eject ink onto the medium supported by the medium support portion, a first sensor configured to detect the medium supported by the medium support portion, a second sensor configured to detect the medium supported by the medium support portion, and a sensor attachment component to which the first sensor and the second sensor are attached, wherein the first sensor and the second sensor each include a light-projecting unit and a light-receiving unit facing each other with a space through which the medium support portion passes interposed therebetween, and the sensor attachment component is attachable and detachable with the first sensor and the second sensor attached.

DESCRIPTION OF EMBODIMENTS

Figure 1:
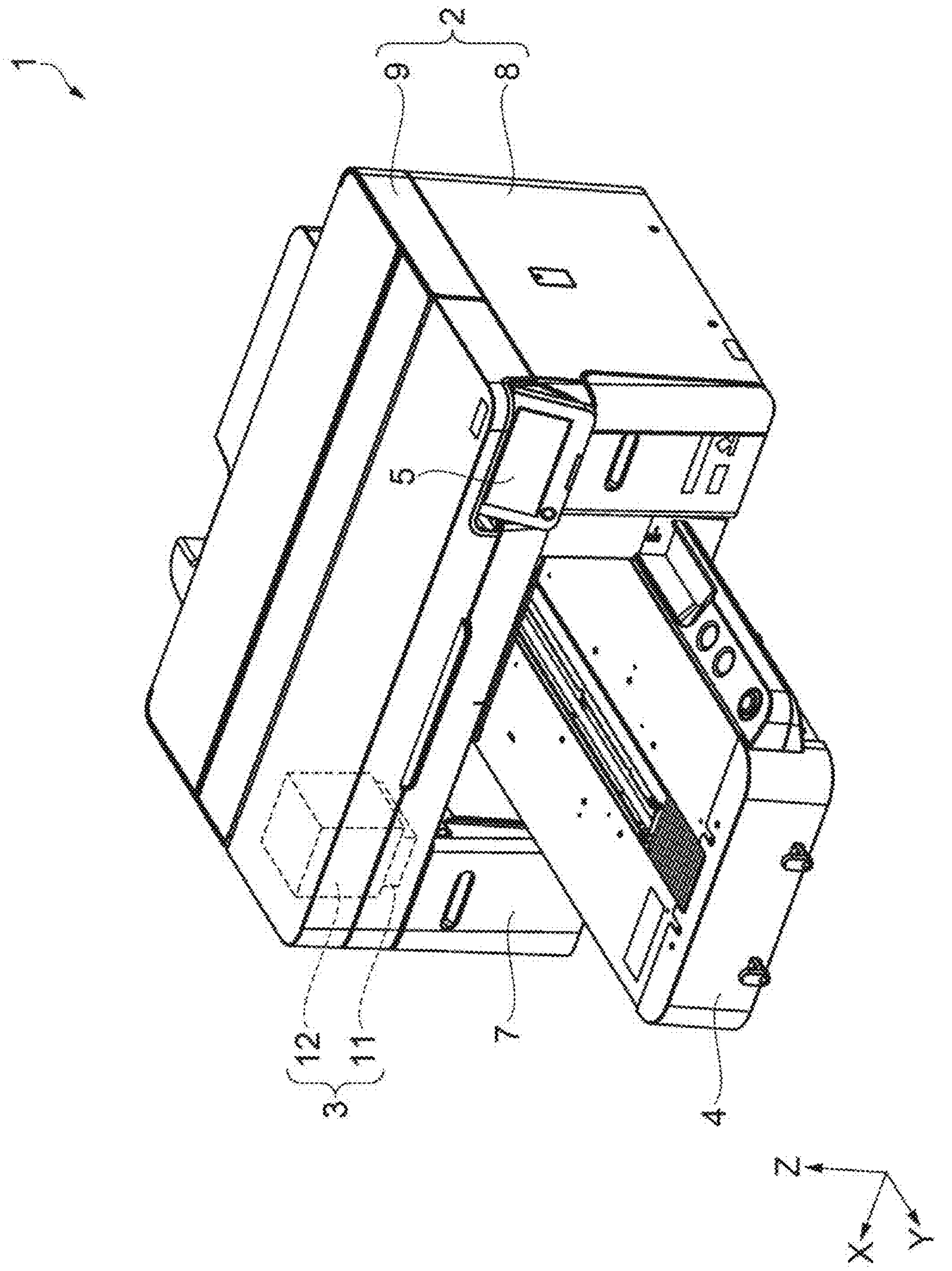
FIG. 1 is a perspective view illustrating a printing apparatus.

As illustrated in FIG. 1, a printing apparatus 1 includes an outer packaging 2, a printing unit 3, a medium transport unit 4 and an operating panel 5. The outer packaging 2 constitutes an outer shell of the printing apparatus 1. The printing unit 3 is accommodated in the outer packaging 2. The medium transport unit 4 protrudes from an inside of the outer packaging 2 to an outside of the outer packaging 2. Among side surfaces of the outer packaging 2, a side surface from which the medium transport unit 4 protrudes is a front surface 7 of the printing apparatus 1. The operating panel 5 is arranged at the front surface 7. The operating panel 5 receives instructions for various operations related to the printing apparatus 1. The outer packaging 2 includes a first outer packaging 8 and a second outer packaging 9.

In FIG. 1, an X-axis, a Y-axis and a Z-axis are added. The X-axis, the Y-axis and the Z-axis are coordinate axes perpendicular to each other. The X-axis, the Y-axis and the Z-axis are also added to subsequent drawings as necessary. In this case, the X-axis, the Y-axis and the Z-axis in each drawing correspond to the X-axis, the Y-axis and the Z-axis in FIG. 1. FIG. 1 illustrates a state where the printing apparatus 1 is arranged on an XY plane defined by the X-axis and the Y-axis. In the embodiment, a state where the printing apparatus 1 is arranged on the XY plane while the XY plane is matched with a horizontal plane is a usage state of the printing apparatus 1. Posture of the printing apparatus 1 when the printing apparatus 1 is arranged on the XY plane that is matched with the horizontal plane is referred to as usage posture of the printing apparatus 1.

In the following, the X-axis, the Y-axis, and the Z-axis that are indicated in drawings or descriptions illustrating components or units of the printing apparatus 1 mean the X-axis, the Y-axis, and the Z-axis in a state where the components or units are incorporated in the printing apparatus 1. Further, posture of each component or unit in the usage posture of the printing apparatus 1 is referred to as a usage posture of the component or unit. In addition, in the following description of the printing apparatus 1, the component, unit, or the like thereof, unless otherwise specified, description will be made in each usage posture.

Note that in a situation where the printing apparatus 1 is actually used, it is sufficient that the horizontal plane is a plane which is substantially horizontal. The substantial horizontality includes an inclination within an allowable inclination range for the plane on which the printing apparatus 1 is placed when used, for example. For this reason, the substantially horizontal plane is not limited to a plane of a surface plate or the like formed with high accuracy, for example. Examples of the substantially horizontal plane include various planes such as a desk, a table, a shelf and a floor on which the printing apparatus 1 is placed when used. Further, a vertical direction is not limited to a direction precisely along a direction of gravity, but includes a direction perpendicular to the substantially horizontal plane. Therefore, when the substantially horizontal plane is, for example, a plane such as a desk, a table, a shelf, a floor, or the like, the vertical direction indicates a direction perpendicular to the plane.

An arrow is added to each of the X-axis, the Y-axis and the Z-axis. In each of the X-axis, the Y-axis and the Z-axis, a direction of the arrow indicates a + (positive) direction, and a direction opposite to the direction of the arrow indicates a − (negative) direction. The Z-axis is an axis perpendicular to the XY plane. In the usage state of the printing apparatus 1, a +Z direction is a vertically upward direction. In the usage state of the printing apparatus 1, a −Z direction is a vertically downward direction in FIG. 1.

Note that the printing unit 3 reciprocates along the X-axis. Therefore, the X-axis is defined as a direction in which the printing unit 3 reciprocates. The printing unit 3 includes a printing head 11 and a carriage 12. The printing head 11 ejects ink toward a printing medium. The printing head 11 is mounted at the carriage 12. The carriage 12 reciprocates along the X-axis. When the carriage 12 reciprocates along the X-axis, the printing head 11 reciprocates along the X-axis.

The medium transport unit 4 protrudes from the outer packaging 2 in a +Y direction. The +Y direction is a direction in which the medium transport unit 4 protrudes from the outer packaging 2. The medium transport unit 4 is positioned in the −Z direction of the printing unit 3. The second outer packaging 9 is positioned in the +Z direction of the first outer packaging 8. The medium transport unit 4 protrudes from an inside of the first outer packaging 8 to an outside of the first outer packaging 8.

Figure 2:
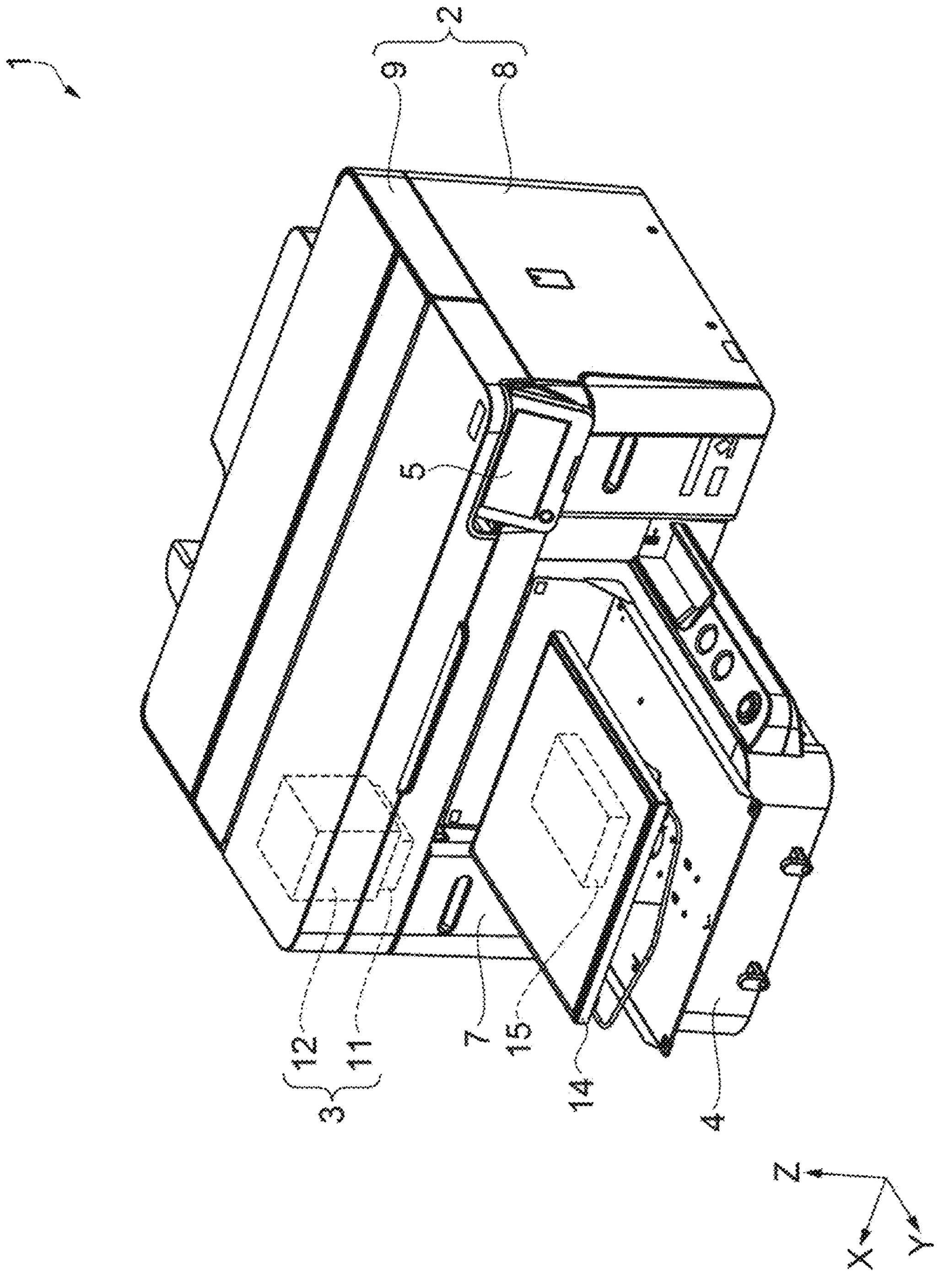
FIG. 2 is a perspective view illustrating the printing apparatus.

As illustrated in FIG. 2, the medium transport unit 4 includes a tray 14 and a stage 15. The tray 14 supports a printing medium. The tray 14 is an example of a medium support portion. The stage 15 supports the tray 14. The tray 14 is arranged in the +Z direction of the stage 15. The stage 15 is reciprocated along the Y-axis by the medium transport unit 4. Thus, the tray 14 reciprocates along the Y-axis. The tray 14 is reciprocated between the outside of the outer packaging 2 and the inside of the outer packaging 2 by the medium transport unit 4. FIG. 2 illustrates a state where the tray 14 is positioned outside the outer packaging 2. FIG. 1 illustrates a state where the tray 14 is positioned inside the outer packaging 2. Note that in the embodiment, the stage 15 is configured to support a medium through the tray 14, but the stage 15 may be configured to directly support a medium and also serve as the medium transport unit 4.

As illustrated in FIG. 2, when the tray 14 is positioned outside the outer packaging 2, a printing medium is set on the tray 14. The printing medium set on the tray 14 is transported into the outer packaging 2 by the medium transport unit 4. The printing apparatus 1 performs printing on the printing medium by performing operation of causing ink to be ejected from the printing head 11 and operation of moving the tray 14 by a predetermined amount in the +Y direction. At this time, the printing apparatus 1 causes the ink to be ejected from the printing head 11 while reciprocating the carriage 12 along the X-axis.

Figure 3:
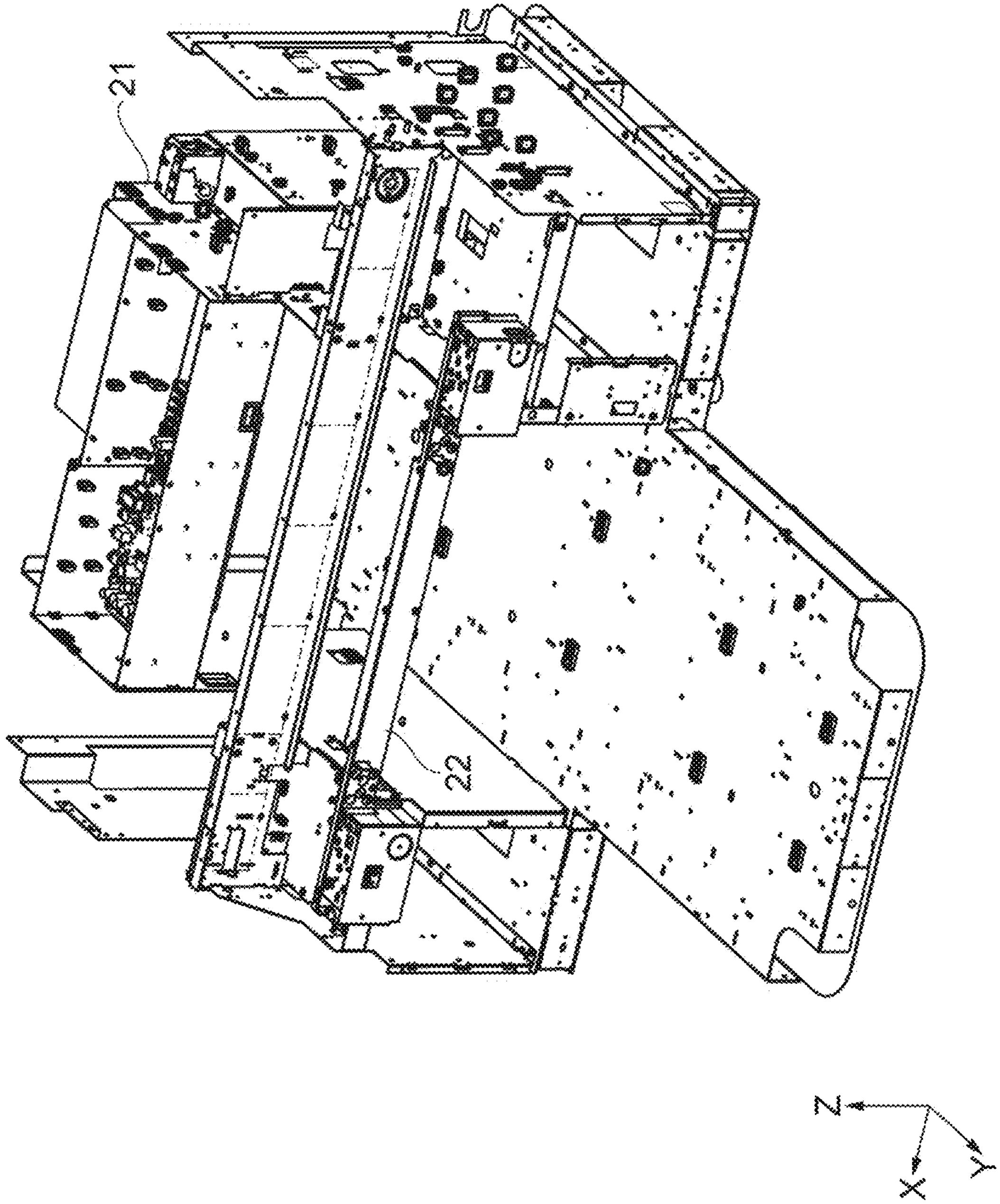
FIG. 3 is a perspective view illustrating a frame unit and a sensor unit.

As illustrated in FIG. 3, the printing apparatus 1 includes a frame unit 21 and a sensor unit 22. The frame unit 21 is a base to which components and various mechanism units of the printing apparatus 1 are attached. The sensor unit 22 is attached to the frame unit 21. The sensor unit 22 detects a height of a printing medium (not illustrated). Based on a detection result by the sensor unit 22, a distance between the printing head 11 and the printing medium illustrated in FIG. 2 is adjusted to be within an appropriate range. By adjusting the distance between the printing head 11 and the printing medium to be within an appropriate range, print quality for the printing medium is appropriately maintained.

When the distance between the printing head 11 and the printing medium exceeds an upper limit, a landing position of ink ejected from the printing head 11 is likely to vary. When the distance between the printing head 11 and the printing medium falls below a lower limit, the printing medium is likely to come into contact with the printing head 11. When the printing medium comes into contact with the printing head 11, rubbing of ink adhering to the printing medium occurs. In addition, when the printing medium comes into contact with the printing head 11, foreign matter such as dust or fluff is likely to adhere to the printing head 11. When foreign matter adheres to the printing head 11, deflection of ejected ink or the like may occur.

Figure 4:
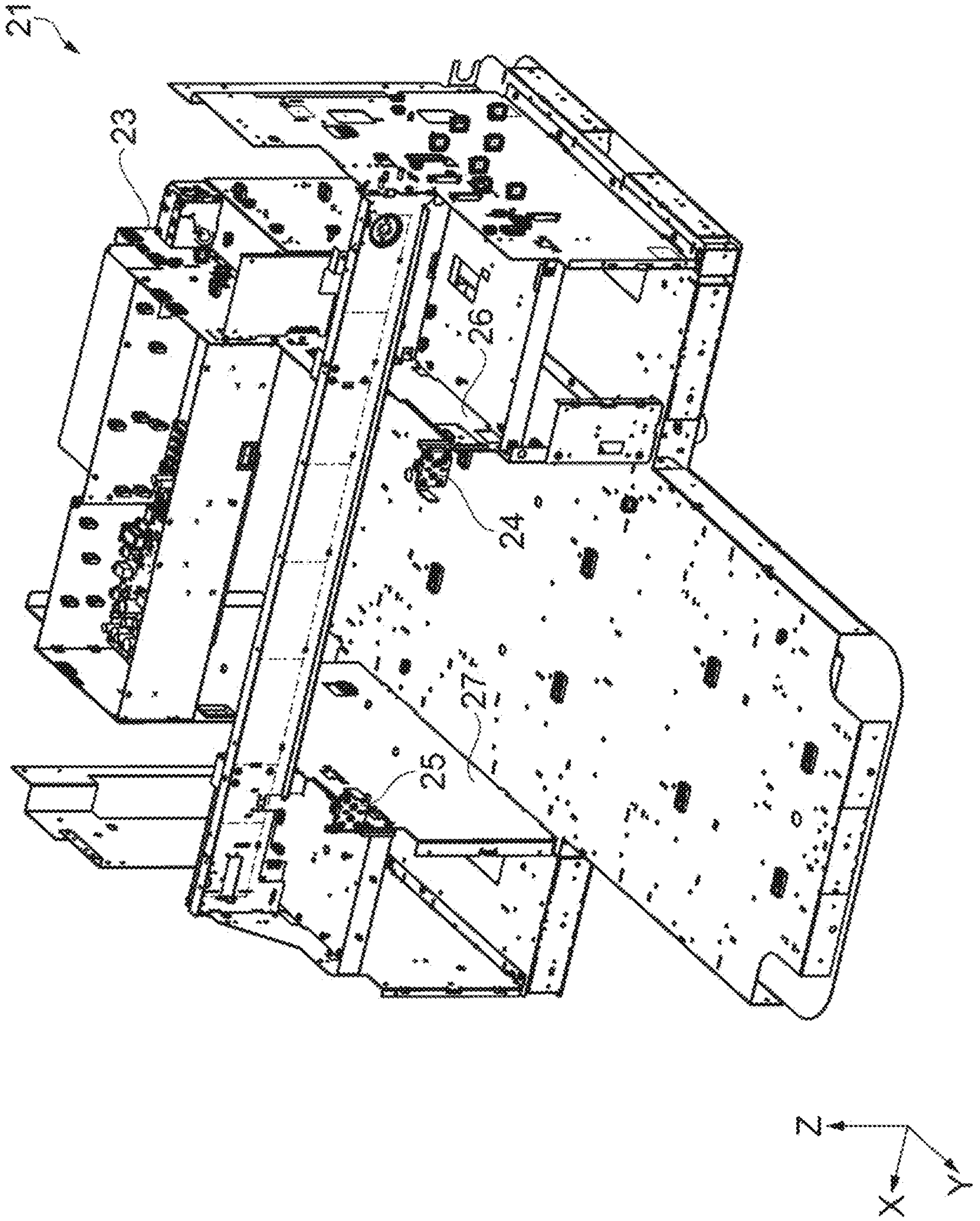
FIG. 4 is a perspective view illustrating the frame unit.

The sensor unit 22 is attachable to and detachable from the frame unit 21. As illustrated in FIG. 4, the frame unit 21 includes an apparatus frame 23, a first fixing member 24 and a second fixing member 25. Each of the first fixing member 24 and the second fixing member 25 is an example of a fixing plate. The apparatus frame 23 includes a first frame 26 and a second frame 27. The first frame 26 and the second frame 27 are each formed of a sheet metal. The apparatus frame 23 is configured by combining various sheet metals. As a method of combining various sheet metals, various methods such as fixing with screws, welding, caulking and the like are applied.

Figure 5:
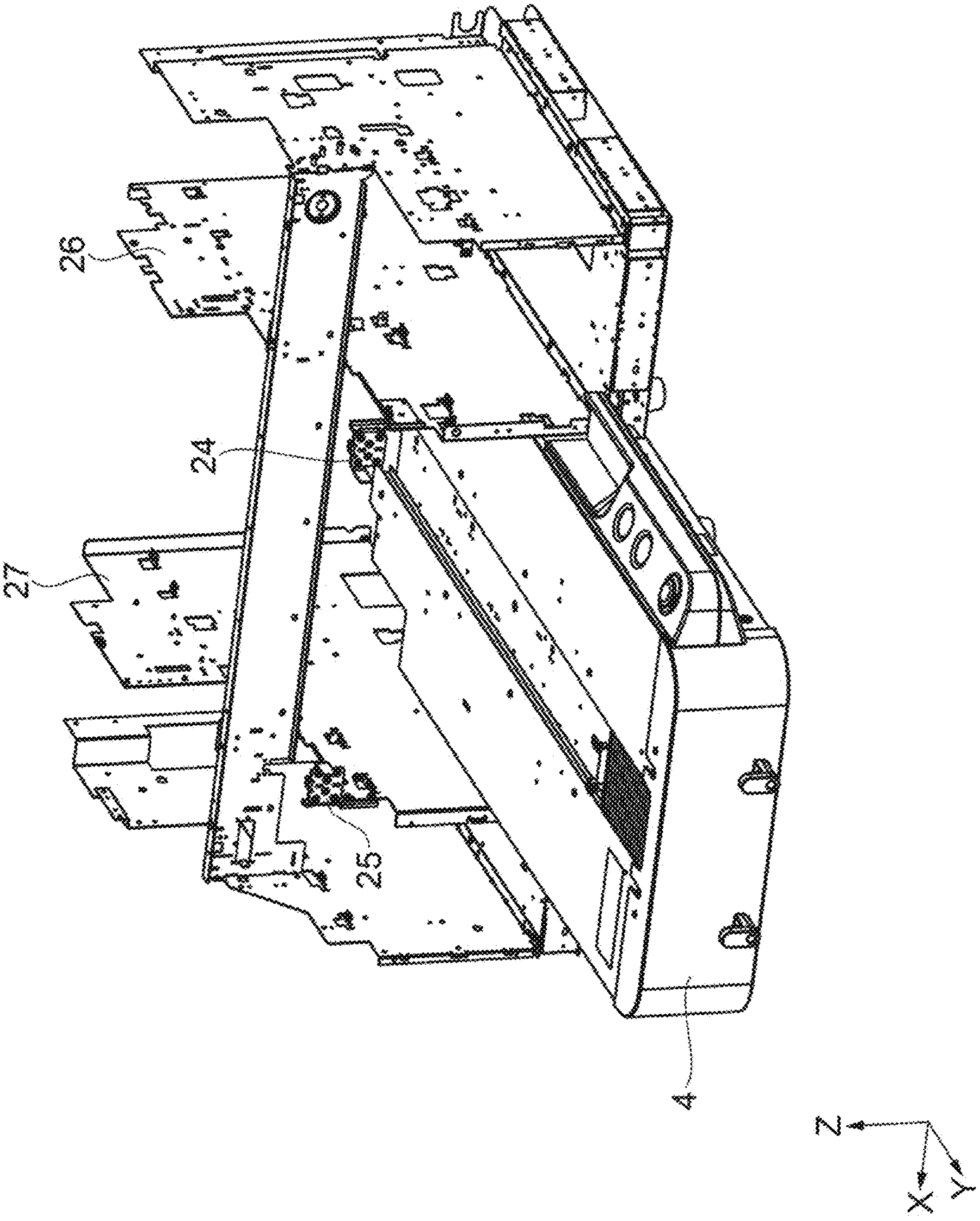
FIG. 5 is a perspective view illustrating an arrangement of a medium transport unit, a first frame and a second frame.

As illustrated in FIG. 5, most of a plate-shaped area of each of the first frame 26 and the second frame 27 extends along a YZ plane. The first frame 26 and the second frame 27 face each other with the medium transport unit 4 interposed therebetween. The medium transport unit 4 is positioned between the first frame 26 and the second frame 27. The first frame 26 is positioned in the −X direction of the medium transport unit 4. The second frame 27 is positioned in the +X direction of the medium transport unit 4. The first fixing member 24 is fixed to the first frame 26 with a screw. The second fixing member 25 is fixed to the second frame 27 with a screw. The sensor unit 22 illustrated in FIG. 3 is fixed to the first fixing member 24 and the second fixing member 25 illustrated in FIG. 5 with screws.

Figure 6:
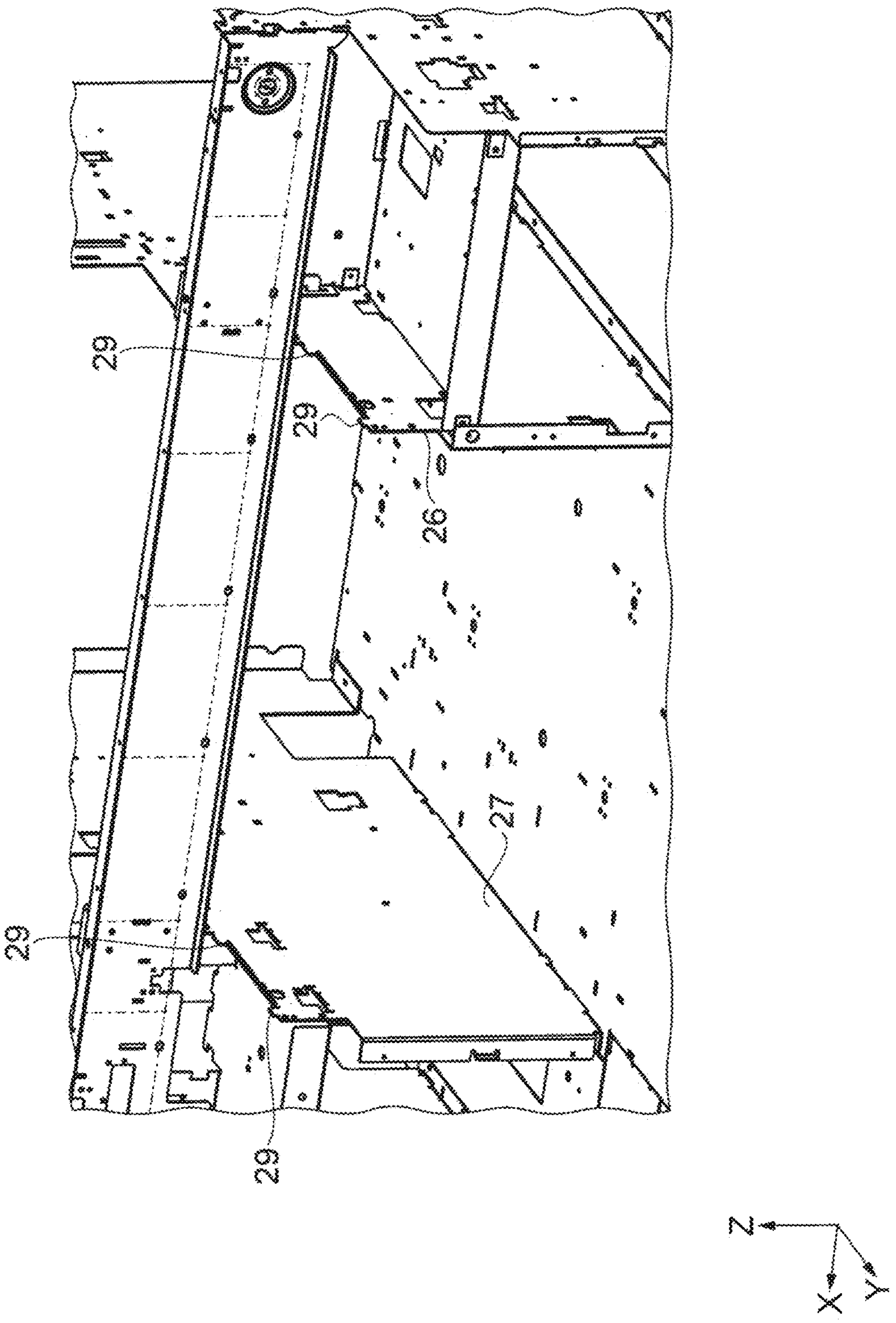
FIG. 6 is a perspective view illustrating reference points.

As illustrated in FIG. 6, reference points 29 are set in each of the first frame 26 and the second frame 27. The reference points 29 are references for positional accuracy of the components and the various mechanism units of the printing apparatus 1. The reference point 29 is an example of a reference portion. Height accuracy and posture accuracy of the printing head 11 in the printing apparatus 1 are set to fall within a predetermined range with reference to the reference point 29. Height accuracy and posture accuracy of the sensor unit 22 illustrated in FIG. 3 are set to fall within a predetermined range with reference to the reference point 29 illustrated in FIG. 6. The height accuracy and the posture accuracy of the sensor unit 22 are determined with reference to the reference point 29.

Figure 7:
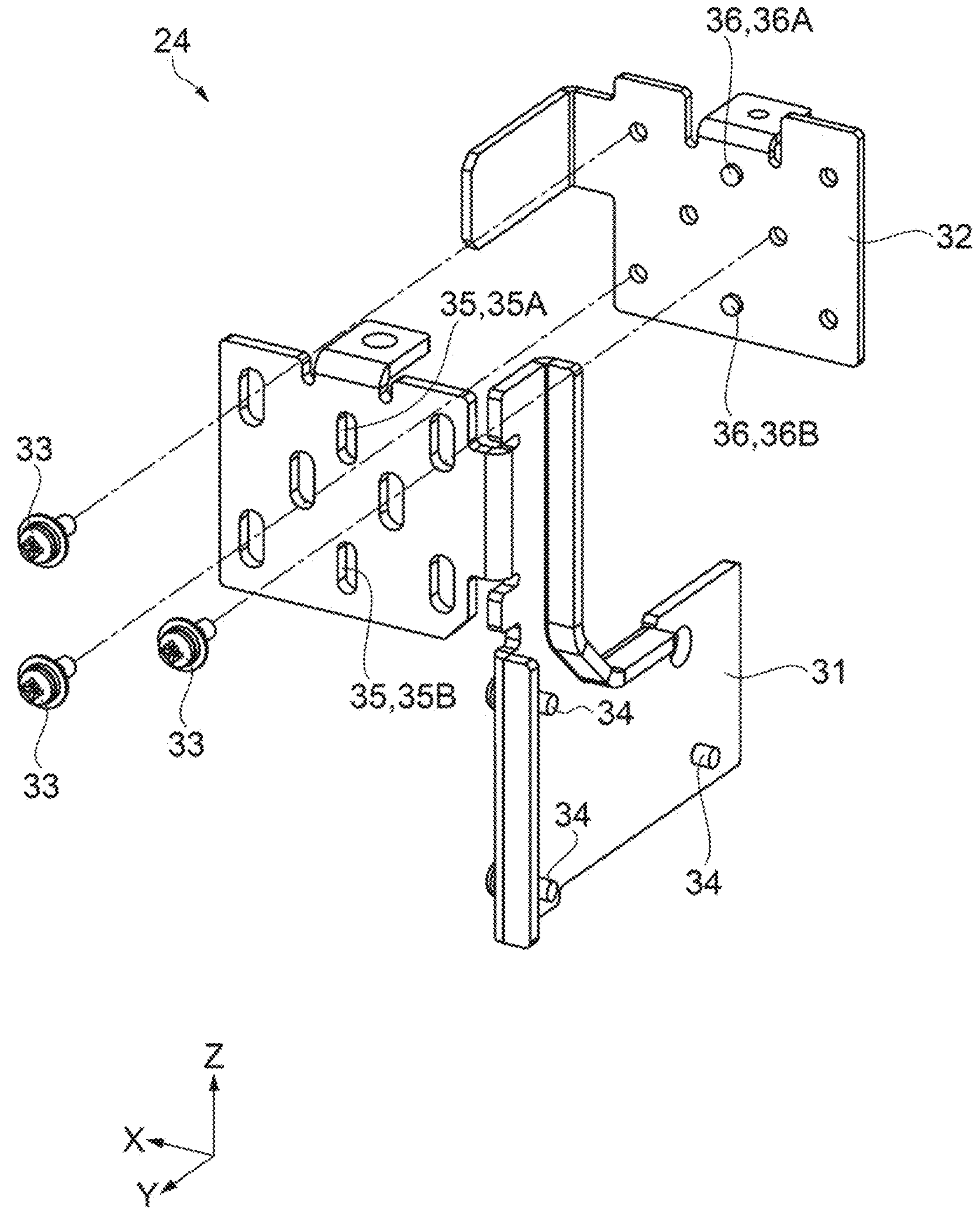
FIG. 7 is an exploded perspective view illustrating a first fixing member.

As illustrated in FIG. 7, the first fixing member 24 includes a first base member 31, a first elevating member 32 and a screw 33. The first fixing member 24 is configured by fixing the first base member 31 and the first elevating member 32 with the screw 33. The first base member 31 is fixed to the first frame 26 illustrated in FIG. 5 by a screw 34. As illustrated in FIG. 7, two guide holes 35 are formed at the first base member 31. Two protrusions 36 are formed at the first elevating member 32. The two guide holes 35 are distinguished from each other by being denoted as a guide hole 35A and a guide hole 35B, respectively. The two protrusions 36 are distinguished from each other by being denoted as a protrusion 36A and a protrusion 36B, respectively.

Each of the two guide holes 35 has an elongated hole shape along the Z-axis. The protrusion 36A corresponds to the guide hole 35A. The protrusion 36B corresponds to the guide hole 35B. The protrusion 36A is inserted into the guide hole 35A, and the protrusion 36B is inserted into the guide hole 35B. Each of the two protrusions 36 is slidable along the elongated hole shape of the guide hole 35 in a state of being inserted into the guide hole 35. That is, when the protrusion 36 inserted into the guide hole 35 is guided by the guide hole 35, the first elevating member 32 can be lifted and lowered along the Z-axis with respect to the first base member 31.

Figure 8:
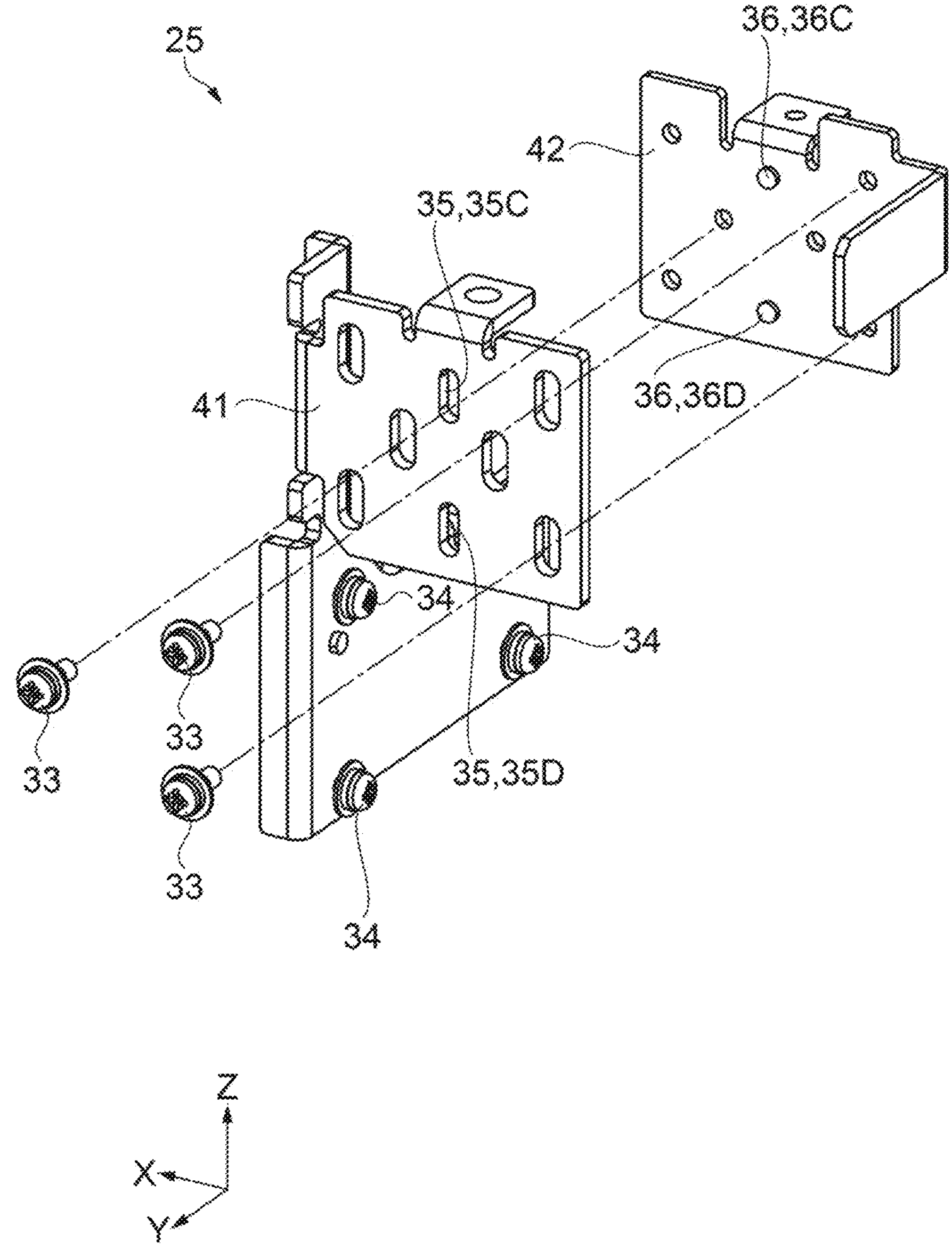
FIG. 8 is an exploded perspective view illustrating a second fixing member.

As illustrated in FIG. 8, the second fixing member 25 includes a second base member 41, a second elevating member 42 and the screw 33. The second fixing member 25 is configured by fixing the second base member 41 and the second elevating member 42 with the screw 33. The second base member 41 is fixed to the second frame 27 illustrated in FIG. 5 by the screw 34. As illustrated in FIG. 8, the two guide holes 35 are formed at the second base member 41. The two protrusions 36 are formed at the second elevating member 42. The two guide holes 35 are distinguished from each other by being denoted as a guide hole 35C and a guide hole 35D, respectively. The two protrusions 36 are distinguished from each other by being denoted as a protrusion 36C and a protrusion 36D, respectively.

Each of the two guide holes 35 has an elongated hole shape along the Z-axis. The protrusion 36C corresponds to the guide hole 35C. The protrusion 36D corresponds to the guide hole 35D. The protrusion 36C is inserted into the guide hole 35C, and the protrusion 36D is inserted into the guide hole 35D. Each of the two protrusions 36 is slidable along the elongated hole shape of the guide hole 35 in a state of being inserted into the guide hole 35. That is, when the protrusion 36 inserted into the guide hole 35 is guided by the guide hole 35, the second elevating member 42 can be lifted and lowered along the Z-axis with respect to the second base member 41.

Figure 9:
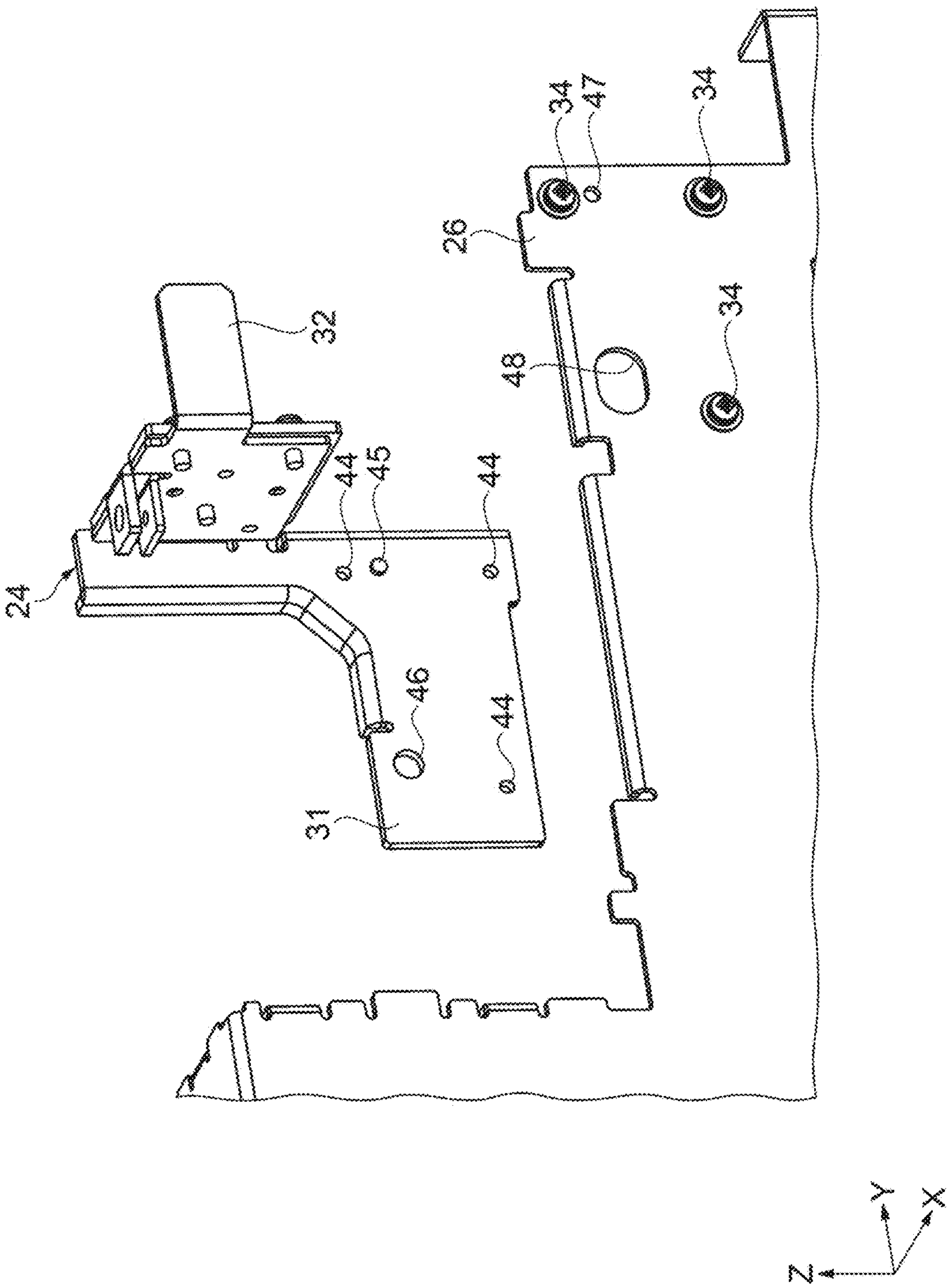
FIG. 9 is an exploded perspective view illustrating the first fixing member and the first frame.
Figure 10:
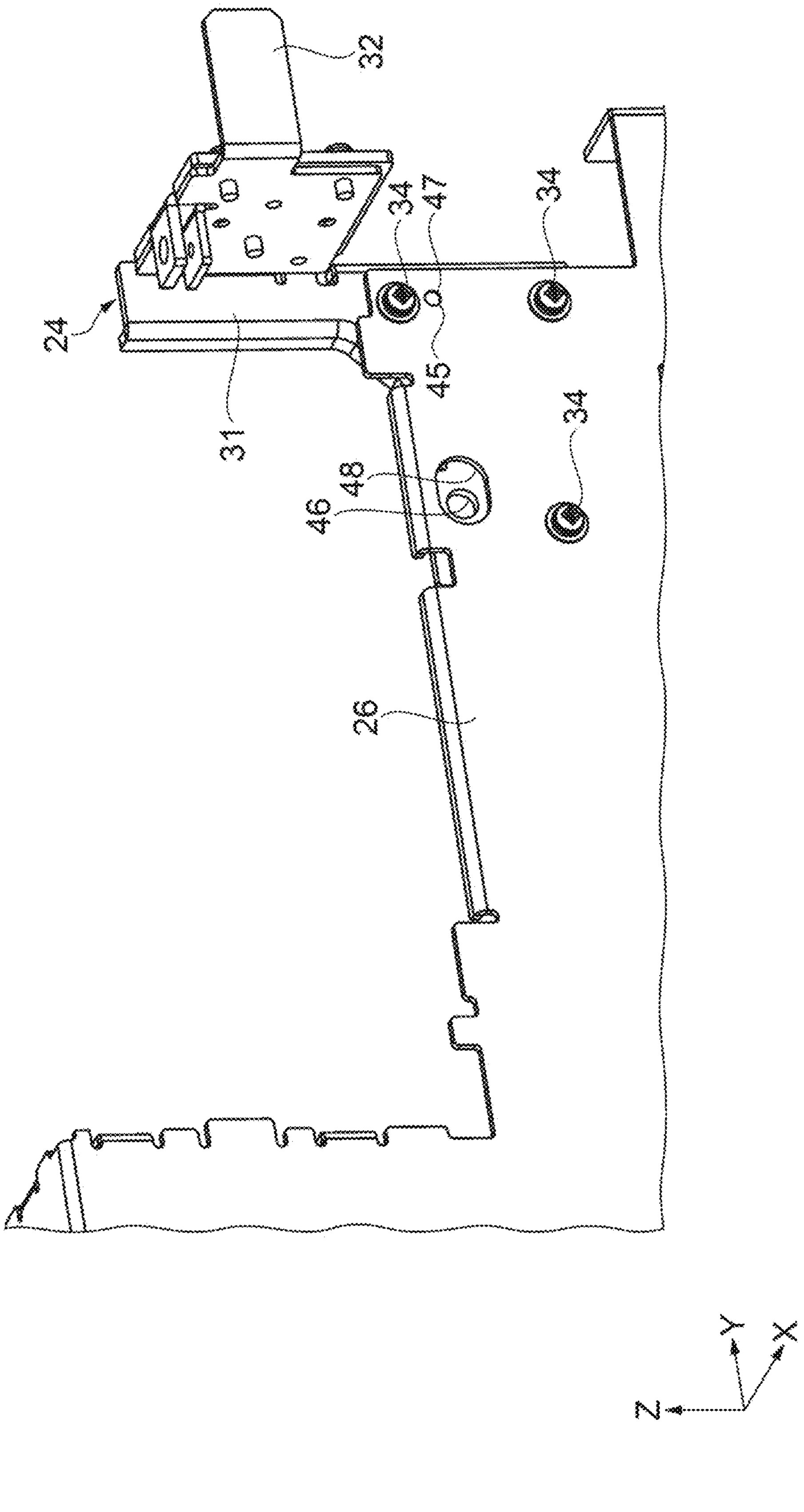
FIG. 10 is a perspective view illustrating the first fixing member and the first frame.

As illustrated in FIG. 9, three screw holes 44, a protrusion 45, and an adjustment hole 46 are formed at the first base member 31 of the first fixing member 24. A fitting hole 47 and a center hole 48 are formed at the first frame 26. The protrusion 45 is inserted into the fitting hole 47. The screw 34 is fixed to the screw hole 44 with the first frame 26 interposed therebetween. An opening area of the center hole 48 is larger than an opening area of the adjustment hole 46. When the screw 34 is fixed to the screw hole 44 with the first frame 26 interposed therebetween in a state where the protrusion 45 is inserted into the fitting hole 47, the adjustment hole 46 overlaps the center hole 48 as illustrated in FIG. 10. In this state, the adjustment hole 46 is exposed through the center hole 48. When the three screws 34 are loosened, an inclination of the first fixing member 24 can be changed with the protrusion 45 as a center. It is possible to change the inclination of the first fixing member 24 with fine accuracy by inserting a jig having a structure in which two columns having different diameters are eccentrically overlapped into the center hole 48 and the adjustment hole 46, and rotating the jig around the center hole 48.

Figure 11:
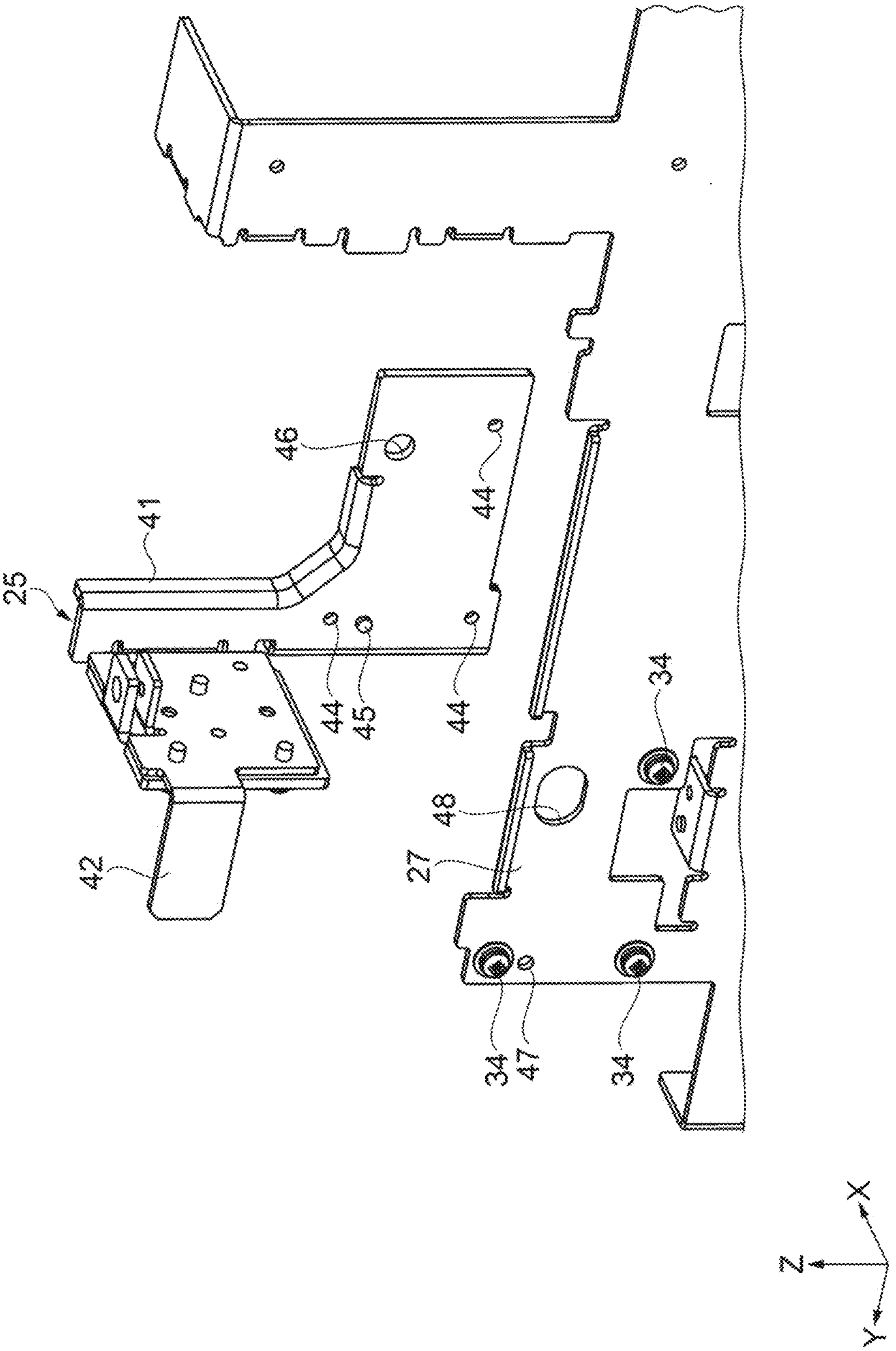
FIG. 11 is an exploded perspective view illustrating the second fixing member and the second frame.
Figure 12:
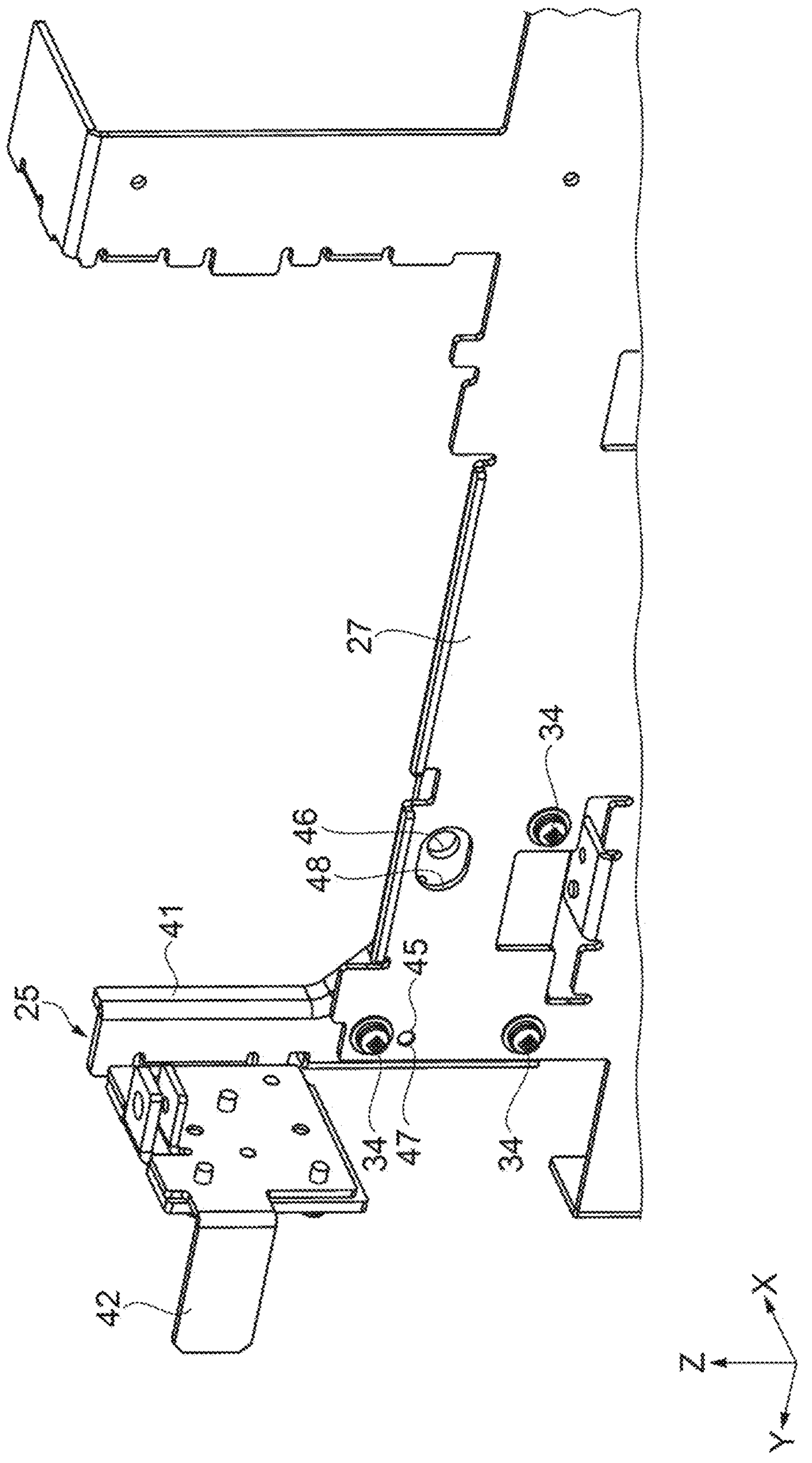
FIG. 12 is a perspective view illustrating the second fixing member and the second frame.

As illustrated in FIG. 11, the three screw holes 44, the protrusion 45, and the adjustment hole 46 are formed at the second base member 41 of the second fixing member 25. The fitting hole 47 and the center hole 48 are formed at the second frame 27. The protrusion 45 is inserted into the fitting hole 47. The screw 34 is fixed to the screw hole 44 with the second frame 27 interposed therebetween. The opening area of the center hole 48 is larger than the opening area of the adjustment hole 46. When the screw 34 is fixed to the screw hole 44 with the second frame 27 interposed therebetween in a state where the protrusion 45 is inserted into the fitting hole 47, the adjustment hole 46 overlaps the center hole 48 as illustrated in FIG. 12. In this state, the adjustment hole 46 is exposed through the center hole 48. When the three screws 34 are loosened, an inclination of the second fixing member 25 can be changed with the protrusion 45 as a center. It is possible to change the inclination of the second fixing member 25 with fine accuracy by inserting a jig having a structure in which two columns having different diameters are eccentrically overlapped into the center hole 48 and the adjustment hole 46, and rotating the jig around the center hole 48.

Figure 13:
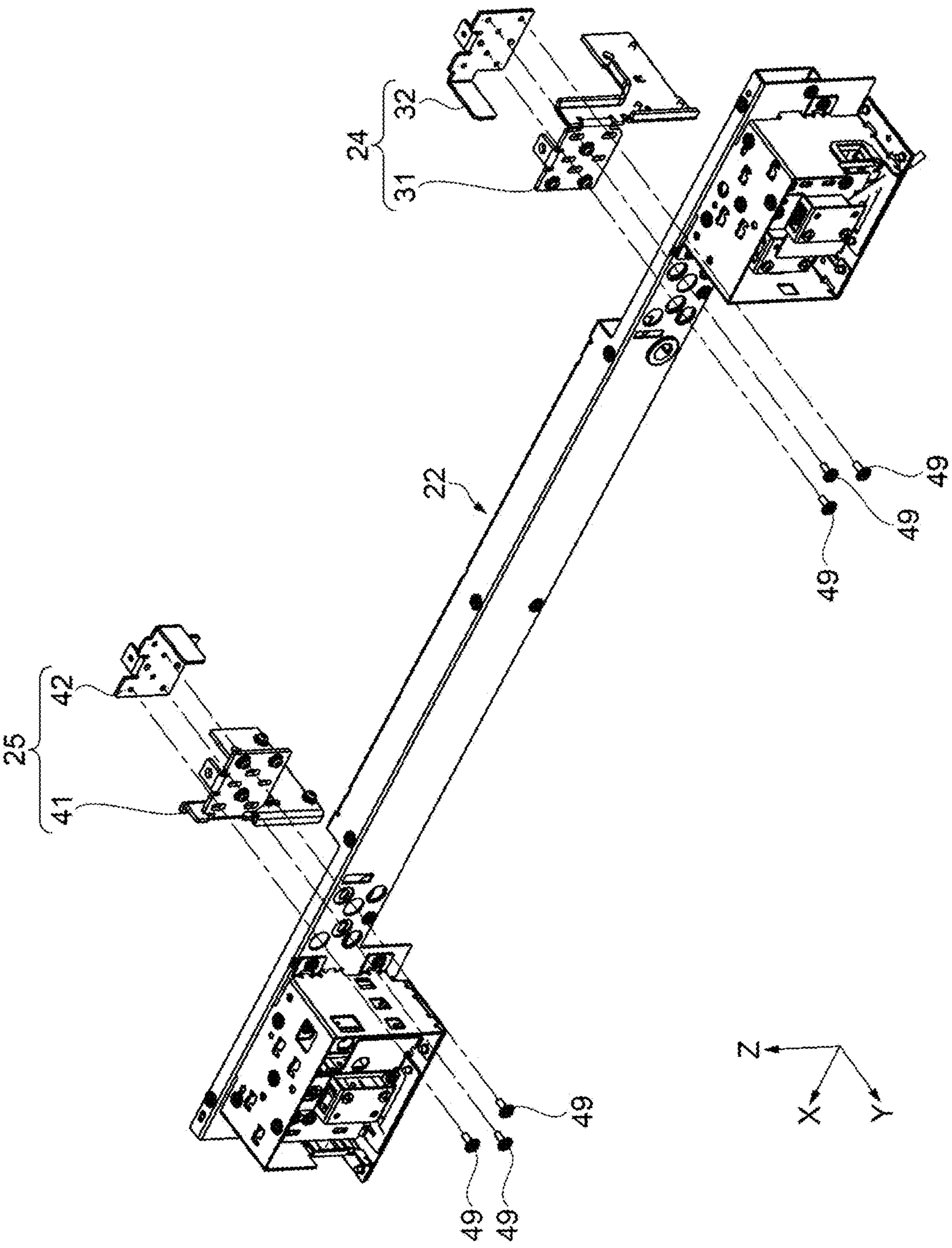
FIG. 13 is an exploded perspective view illustrating a sensor unit, the first fixing member and the second fixing member.
Figure 14:
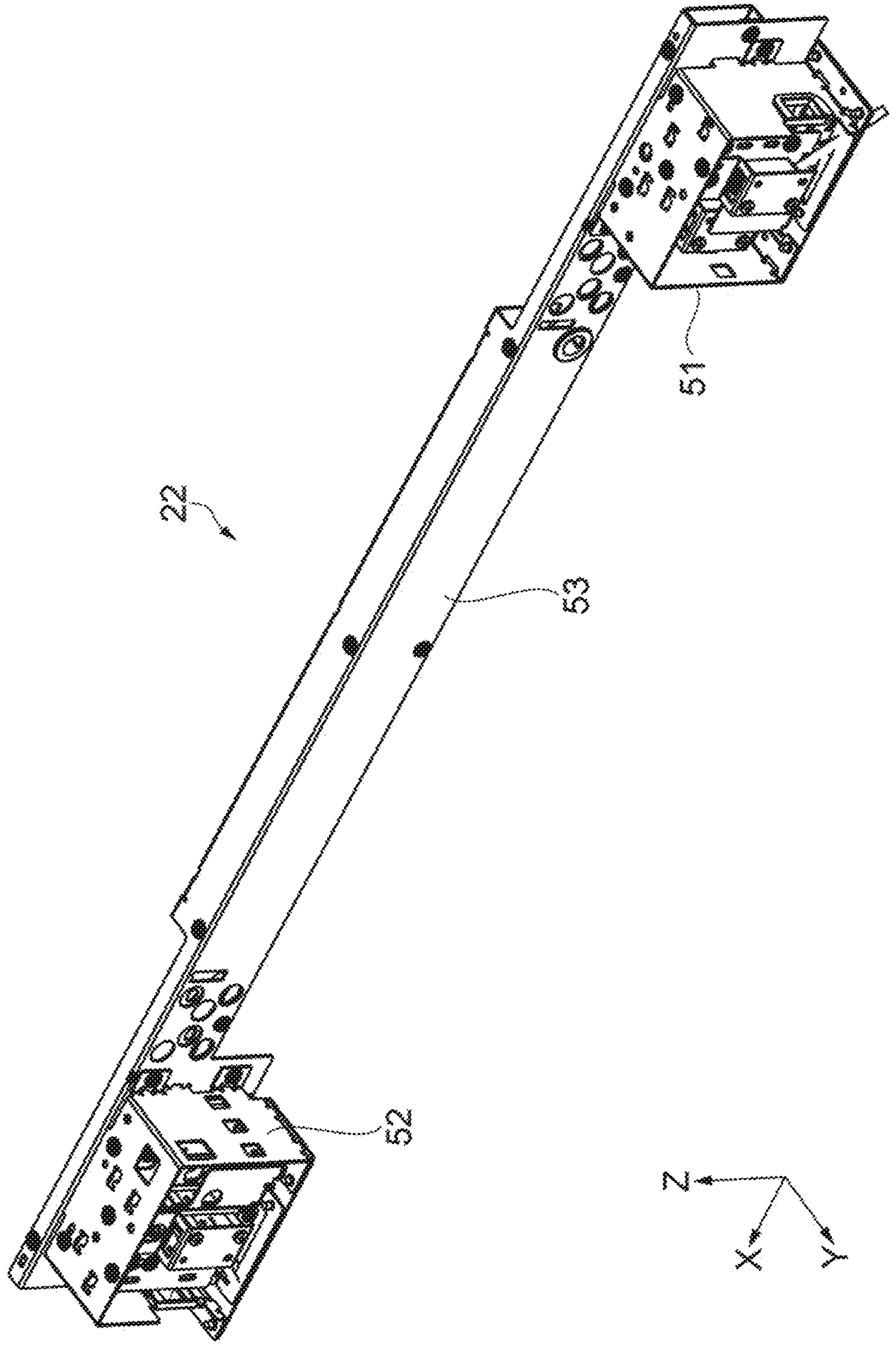
FIG. 14 is a perspective view illustrating the sensor unit.

As illustrated in FIG. 13, the sensor unit 22 is fixed to the first elevating member 32 and the second elevating member 42 by screws 49. Therefore, the sensor unit 22 can be lifted and lowered along the Z-axis with respect to the first base member 31 and the second base member 41 through the first elevating member 32 and the second elevating member 42. Further, an inclination of the sensor unit 22 with respect to the XY plane can be adjusted through the first fixing member 24 and the second fixing member 25. As illustrated in FIG. 14, the sensor unit 22 includes a first unit 51, a second unit 52 and a sensor attachment component 53. The second unit 52 is positioned in the +X direction of the first unit 51. The first unit 51 and the second unit 52 are fixed to the sensor attachment component 53. The first unit 51 and the second unit 52 face each other with the medium transport unit 4 illustrated in FIG. 5 in plan view interposed therebetween.

Figure 15:
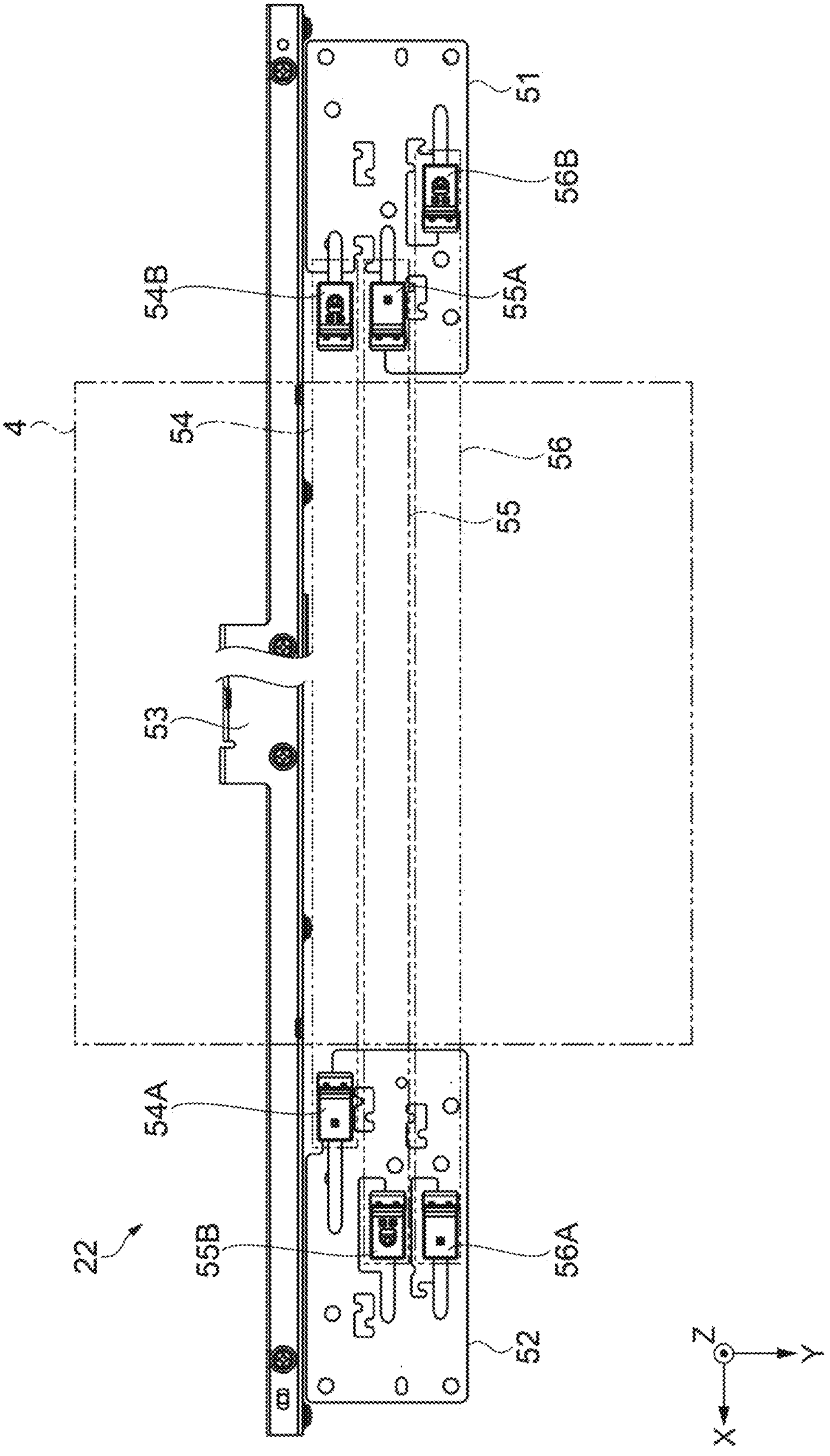
FIG. 15 is a plan view for explaining an arrangement of a first sensor set, a second sensor set and a third sensor set.

As illustrated in FIG. 15, the sensor unit 22 includes a first sensor set 54, a second sensor set 55 and a third sensor set 56. The first sensor set 54 is an example of a first sensor. The second sensor set 55 is an example of a second sensor. The third sensor set 56 is an example of a third sensor. Each of the first sensor set 54, the second sensor set 55 and the third sensor set 56 is an optical sensor. An optical sensor changes an output signal when an object blocks light from a light-projecting unit toward a light-receiving unit. Presence or absence of an object can be detected by the change in the output signal.

The second sensor set 55 is positioned in the +Y direction of the first sensor set 54. The third sensor set 56 is positioned in the +Y direction of the second sensor set 55. The first sensor set 54 includes a first light-projecting unit 54A and a first light-receiving unit 54B. The second sensor set 55 includes a second light-projecting unit 55A and a second light-receiving unit 55B. The third sensor set 56 includes a third light-projecting unit 56A and a third light-receiving unit 56B. The first unit 51 includes the first light-receiving unit 54B, the second light-projecting unit 55A and the third light-receiving unit 56B. The second unit 52 includes the first light-projecting unit 54A, the second light-receiving unit 55B and the third light-projecting unit 56A.

The first light-projecting unit 54A and the first light-receiving unit 54B face each other with the medium transport unit 4 interposed therebetween. That is, the first light-projecting unit 54A and the first light-receiving unit 54B face each other with a space through which the tray 14 and the stage 15 are moved and passed by the medium transport unit 4 interposed therebetween. The first light-projecting unit 54A and the first light-receiving unit 54B are aligned along the X-axis. The first light-projecting unit 54A is positioned in the +X direction of the first light-receiving unit 54B. The first light-projecting unit 54A is positioned in the +X direction which is one side with respect to the space through which the tray 14 and the stage 15 pass. The second light-projecting unit 55A and the second light-receiving unit 55B face each other with the medium transport unit 4 interposed therebetween. That is, the second light-projecting unit 55A and the second light-receiving unit 55B face each other with the space through which the tray 14 and the stage 15 are moved and passed by the medium transport unit 4 interposed therebetween. The second light-projecting unit 55A and the second light-receiving unit 55B are aligned along the X-axis. The second light-projecting unit 55A is positioned in the −X direction of the second light-receiving unit 55B. The second light-projecting unit 55A is positioned in the −X direction which is another side opposite to the one side with respect to the space through which the tray 14 and the stage 15 pass. The third light-projecting unit 56A and the third light-receiving unit 56B face each other with the medium transport unit 4 interposed therebetween. That is, the third light-projecting unit 56A and the third light-receiving unit 56B face each other with the space through which the tray 14 and the stage 15 are moved and passed by the medium transport unit 4 interposed therebetween. The third light-projecting unit 56A and the third light-receiving unit 56B are aligned along the X-axis. The third light-projecting unit 56A is positioned in the +X direction of the third light-receiving unit 56B. The third light-projecting unit 56A is positioned in the +X direction which is the one side with respect to the space through which the tray 14 and the stage 15 pass.

Note that although the configuration in which the tray 14 and the stage 15 are moved by the medium transport unit 4 and a relative positional relationship among the sensor unit 22 and the tray 14 and the stage 15 is changed has been described, a configuration may be employed in which the sensor unit 22 is moved and the relative positional relationship among the sensor unit 22 and the tray 14 and the stage 15 is changed. Even when the sensor unit 22 moves, since the tray 14 and the stage 15 pass through the space sandwiched by the light-projecting unit and the light-receiving unit, it can be said that the light-projecting unit and the light-receiving unit face each other with the space through which the tray 14 and the stage 15 pass interposed therebetween.

In the embodiment, the arrangement of the light-projecting unit and the light-receiving unit along the X-axis alternates among the first sensor set 54, the second sensor set 55 and the third sensor set 56. In the first sensor set 54, a direction of light from the light-projecting unit toward the light-receiving unit is the −X direction. In the second sensor set 55, a direction of light from the light-projecting unit toward the light-receiving unit is the +X direction. In the third sensor set 56, a direction of light from the light-projecting unit toward the light-receiving unit is the −X direction. The reason why the arrangements are alternated when the plurality of optical sensors are arranged in a narrow space is to suppress occurrence of erroneous detection among the optical sensors. The direction of the light from the light-projecting unit toward the light-receiving unit is not limited to the above, and the direction may be the +X direction in the first sensor set 54, may be the −X direction in the second sensor set 55, and may be the +X direction in the third sensor set 56.

Figure 16:
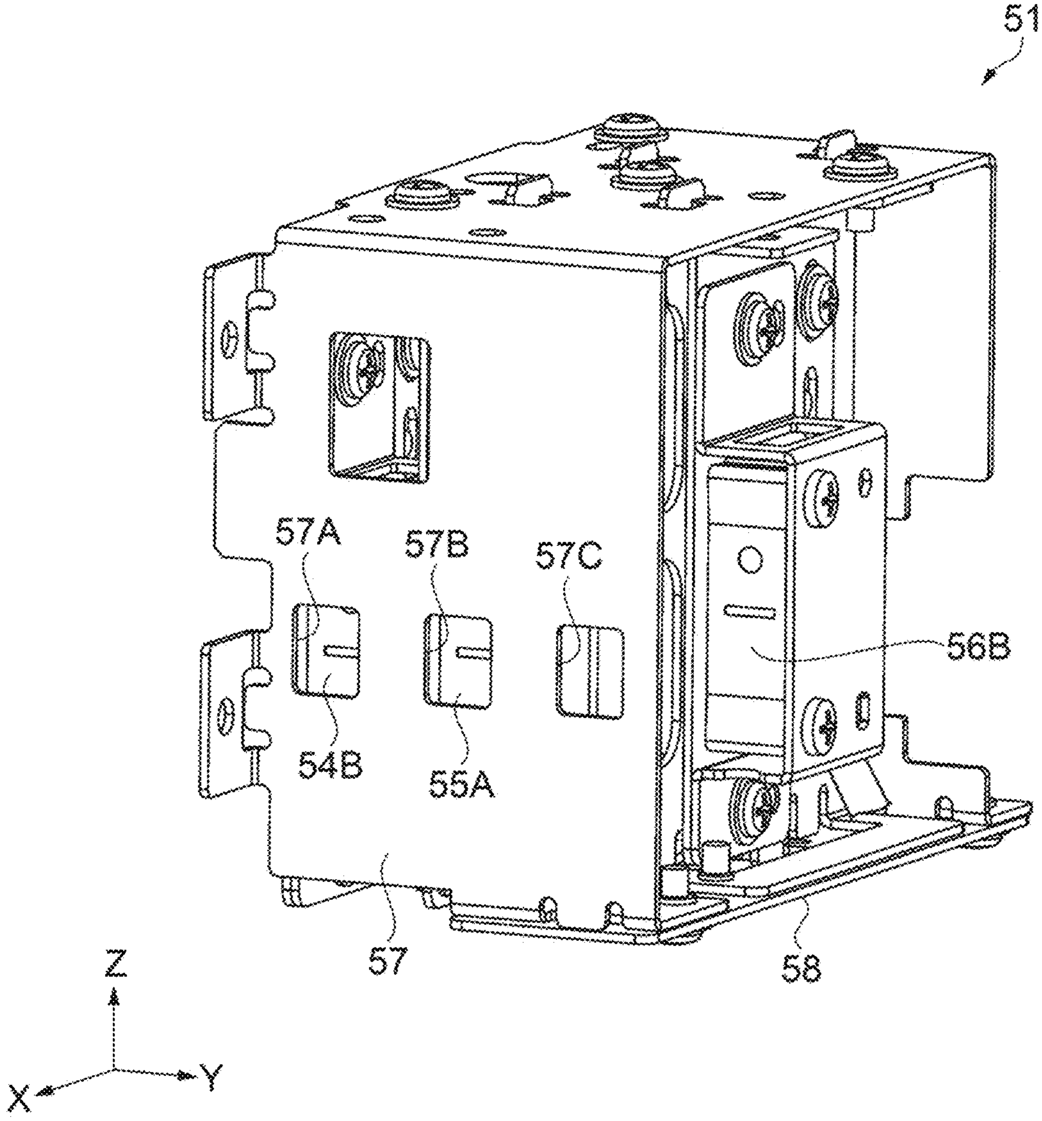
FIG. 16 is a perspective view illustrating a first unit.

As illustrated in FIG. 16, the first unit 51 includes a first case 57 and a first base plate 58. The first case 57 accommodates the first light-receiving unit 54B, the second light-projecting unit 55A and the third light-receiving unit 56B. The first base plate 58 is a plate that supports the first light-receiving unit 54B, the second light-projecting unit 55A and the third light-receiving unit 56B. The first case 57 is fixed to the first base plate 58 with a screw. A first optical axis opening 57A, a second optical axis opening 57B and a third optical axis opening 57C are formed at a side surface in the +X direction of the first case 57. The first optical axis opening 57A is a path of light projected to the first light-receiving unit 54B. The second optical axis opening 57B is a path of light projected from the second light-projecting unit 55A. The third optical axis opening 57C is a path of light projected to the third light-receiving unit 56B.

Figure 17:
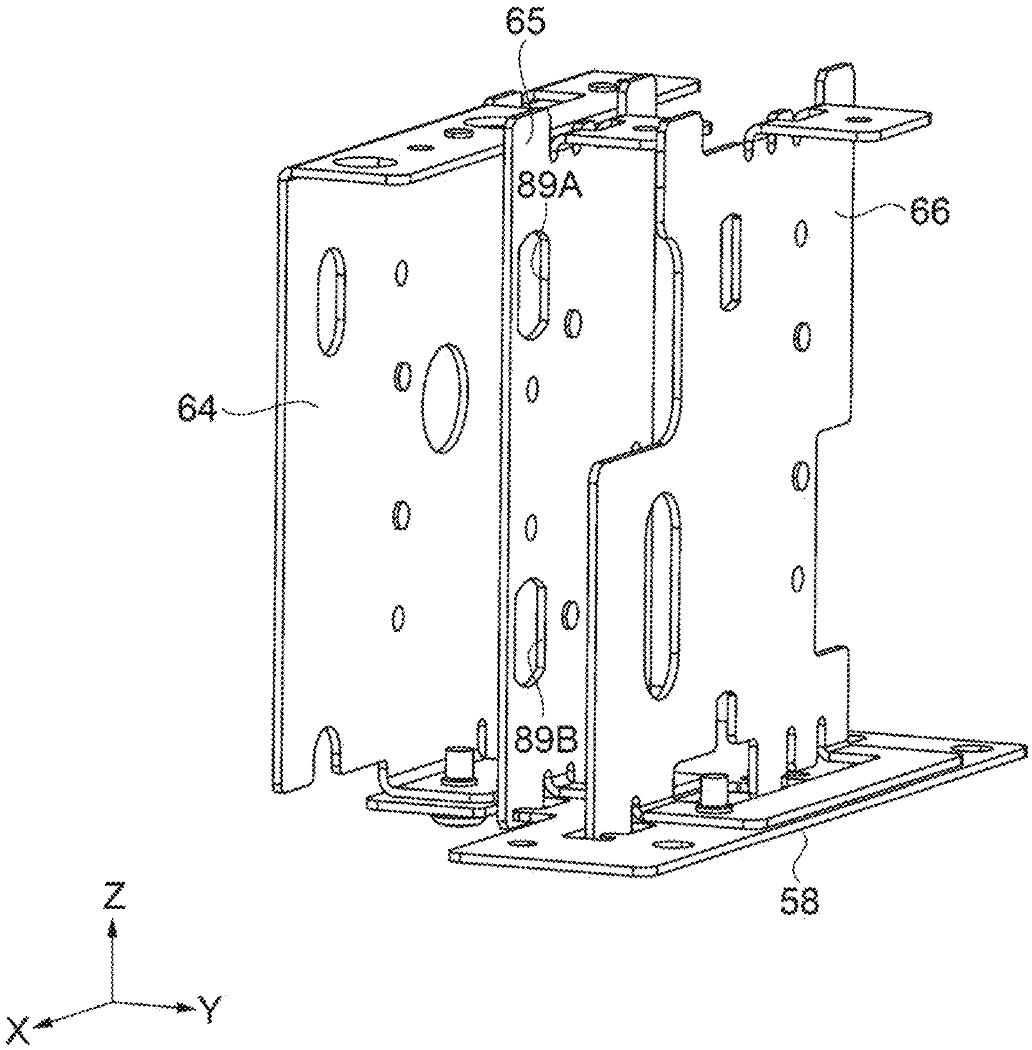
FIG. 17 is a perspective view illustrating a first base plate, a first support plate, a second support plate and a third support plate.
Figure 18:
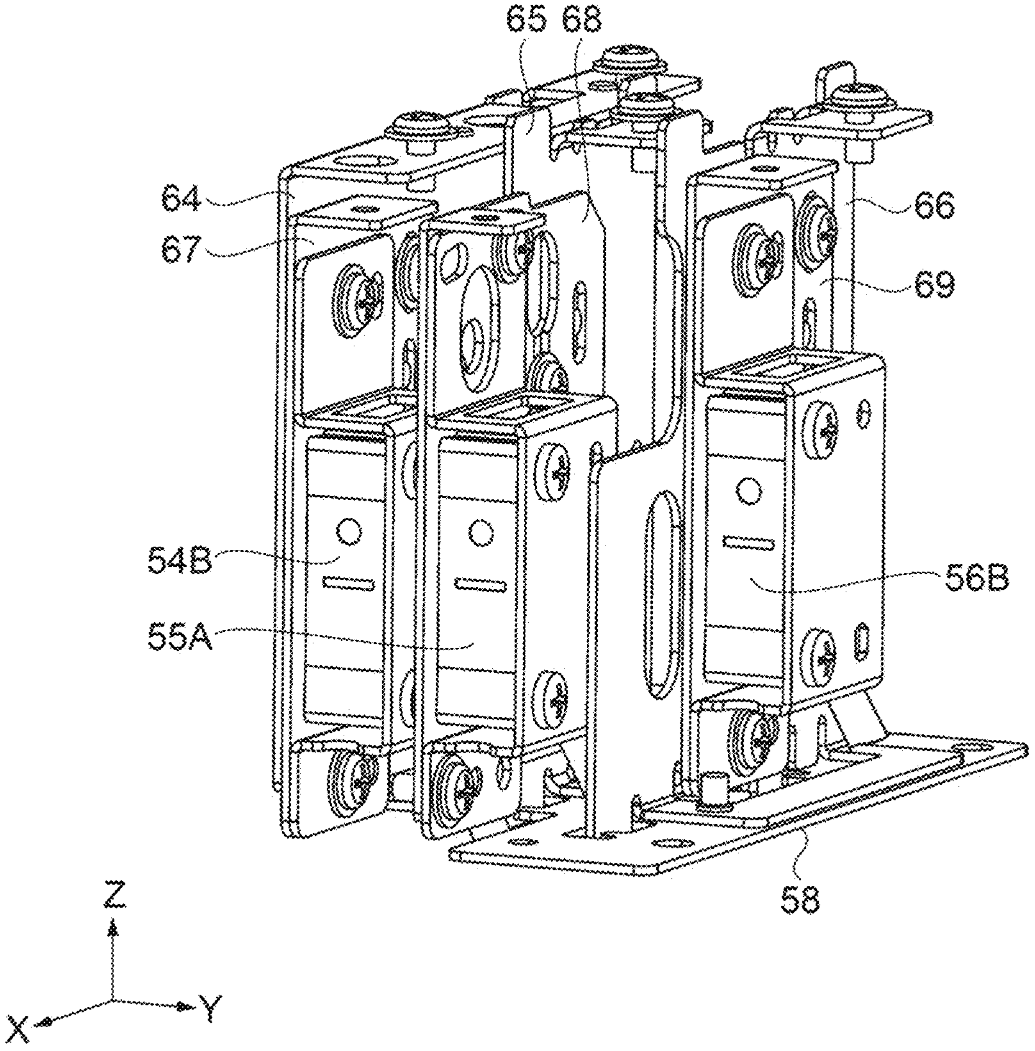
FIG. 18 is a perspective view for explaining fixing of a first light-receiving unit, a second light-projecting unit and a third light-receiving unit.

As illustrated in FIG. 17, a first support plate 64, a second support plate 65 and a third support plate 66 are fixed to the first base plate 58 with screws. Each of the first support plate 64, the second support plate 65 and the third support plate 66 has a surface along an XZ plane. As illustrated in FIG. 18, the first light-receiving unit 54B is supported by the first support plate 64 through a first intermediate plate 67. The second light-projecting unit 55A is supported by the second support plate 65 through a second intermediate plate 68. The third light-receiving unit 56B is supported by the third support plate 66 through a third intermediate plate 69.

Figure 19:
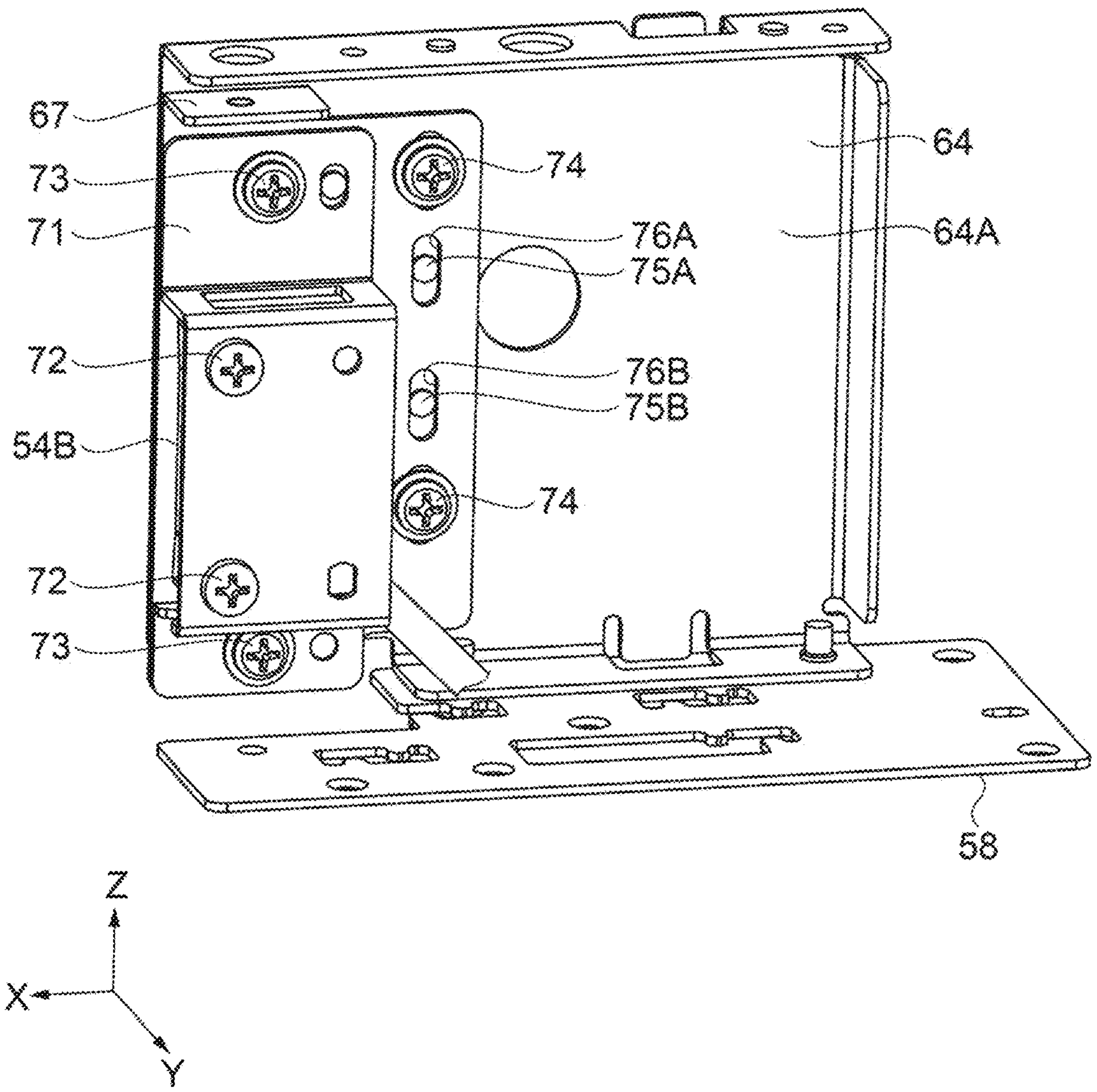
FIG. 19 is a perspective view for explaining fixing of the first light-receiving unit.

As illustrated in FIG. 19, the first light-receiving unit 54B is fixed to a first fixing plate 71 by a screw 72. The first fixing plate 71 is fixed to the first intermediate plate 67 by a screw 73. The first intermediate plate 67 is fixed to the first support plate 64 by a screw 74. A protrusion 75A and a protrusion 75B are formed at the first support plate 64. The protrusion 75A and the protrusion 75B protrude in the +Y direction from a surface 64A along the XZ plane. The protrusion 75A and the protrusion 75B are aligned along the Z-axis. The protrusion 75A is positioned in the +Z direction of the protrusion 75B.

An elongated hole 76A and an elongated hole 76B are formed at the first intermediate plate 67. Each of the elongated hole 76A and the elongated hole 76B has an elongated shape along the Z-axis. The elongated hole 76A and the elongated hole 76B are formed at positions facing the protrusion 75A and the protrusion 75B, respectively. The elongated hole 76A and the elongated hole 76B are aligned along the Z-axis. The elongated hole 76A is positioned in the +Z direction of the elongated hole 76B. The first intermediate plate 67 can be lifted and lowered along the Z-axis in a state where the two screws 74 are loosened. At this time, since the elongated hole 76A and the elongated hole 76B are guided by the protrusion 75A and the protrusion 75B, the first intermediate plate 67 can be lifted and lowered along the Z-axis with high accuracy. Thus, a height position of the first light-receiving unit 54B with respect to the first base plate 58 can be adjusted.

Figure 20:
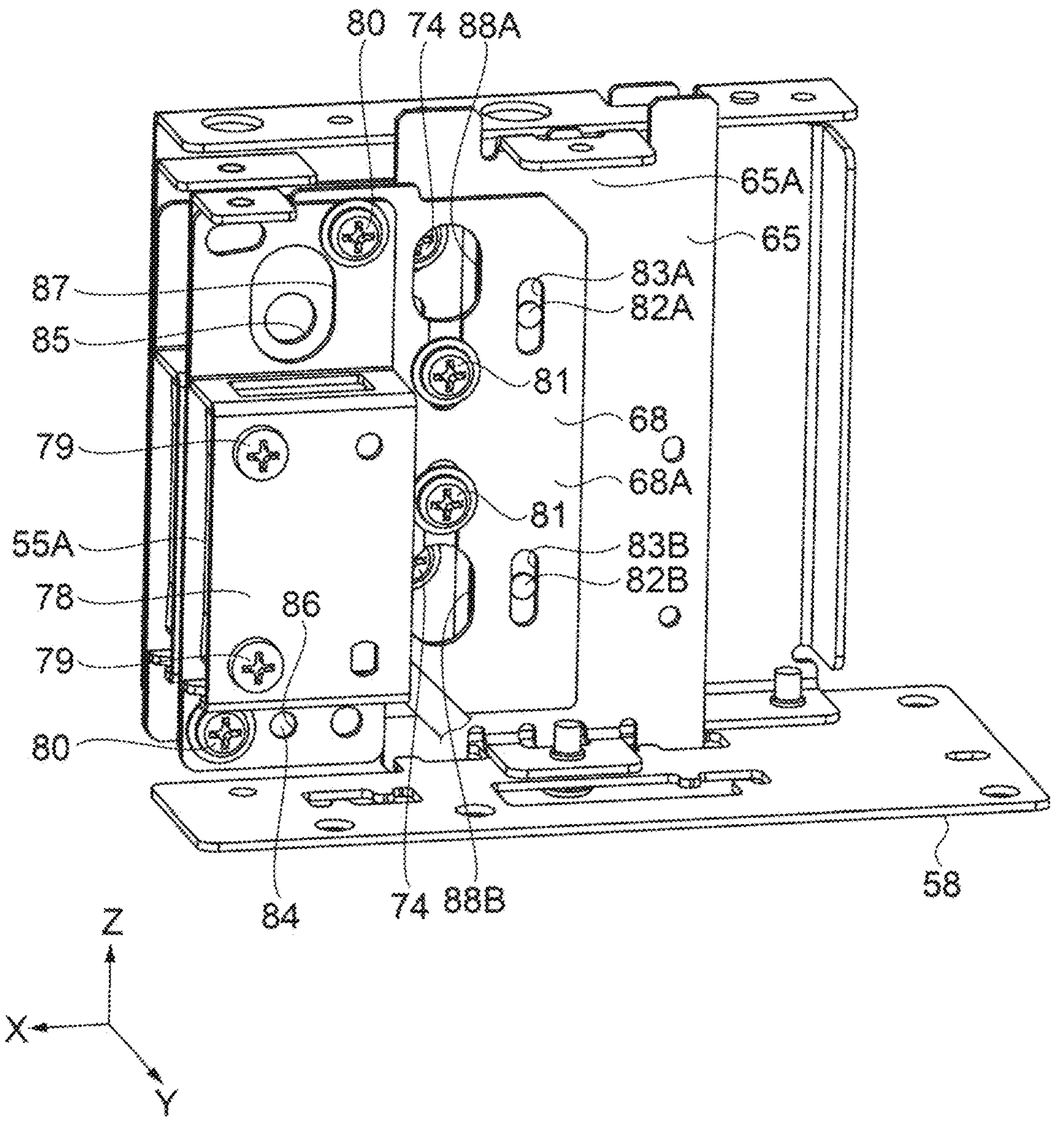
FIG. 20 is a perspective view for explaining fixing of the first light-receiving unit and the second light-projecting unit.

As illustrated in FIG. 20, the second light-projecting unit 55A is fixed to a second fixing plate 78 by a screw 79. The second fixing plate 78 is fixed to the second intermediate plate 68 by a screw 80. The second intermediate plate 68 is fixed to the second support plate 65 by a screw 81. A protrusion 82A and a protrusion 82B are formed at the second support plate 65. The protrusion 82A and the protrusion 82B protrude in the +Y direction from a surface 65A along the XZ plane. The protrusion 82A and the protrusion 82B are aligned along the Z-axis. The protrusion 82A is positioned in the +Z direction of the protrusion 82B.

An elongated hole 83A and an elongated hole 83B are formed at the second intermediate plate 68. Each of the elongated hole 83A and the elongated hole 83B has an elongated shape along the Z-axis. The elongated hole 83A and the elongated hole 83B are formed at positions facing the protrusion 82A and the protrusion 82B, respectively. The elongated hole 83A and the elongated hole 83B are aligned along the Z-axis. The elongated hole 83A is positioned in the +Z direction of the elongated hole 83B. The second intermediate plate 68 can be lifted and lowered along the Z-axis in a state where the two screws 81 are loosened. At this time, since the elongated hole 83A and the elongated hole 83B are guided by the protrusion 82A and the protrusion 82B, the second intermediate plate 68 can be lifted and lowered along the Z-axis with high accuracy. Thus, a height position of the second light-projecting unit 55A with respect to the first base plate 58 can be adjusted.

A protrusion 84 and a center hole 85 are formed at the second intermediate plate 68. The protrusion 84 protrudes in the +Y direction from a surface 68A along the XZ plane. The center hole 85 is opened at the surface 68A. The center hole 85 is positioned in the +Z direction of the protrusion 84. A fitting hole 86 and an adjustment hole 87 are formed at the second fixing plate 78. The protrusion 84 is inserted into the fitting hole 86. An opening area of the adjustment hole 87 is larger than an opening area of the center hole 85. When the second fixing plate 78 is fixed to the second intermediate plate 68 by the screw 80 in a state where the protrusion 84 is inserted into the fitting hole 86, the center hole 85 overlaps the adjustment hole 87. In this state, the center hole 85 is exposed through the adjustment hole 87.

When the screw 80 is loosened, an inclination of the second fixing plate 78 can be changed with the protrusion 84 as a center. It is possible to change the inclination of the second fixing plate 78 with fine accuracy by inserting a jig having a structure in which two columns having different diameters are eccentrically overlapped into the center hole 85 and the adjustment hole 87, and rotating the jig around the center hole 85. Accordingly, an inclination of the second light-projecting unit 55A with respect to the XY plane can be adjusted.

In the embodiment, the inclination of the light-projecting unit of the optical sensor including the light-projecting unit and the light-receiving unit can be adjusted. This is because, in the optical sensor, an inclination of an optical axis with respect to the light-receiving unit needs to be maintained with high accuracy. On the other hand, what is preferentially required for the light-receiving unit of the optical sensor is not inclined posture of the light-receiving unit with respect to the optical axis, but positional accuracy of the light-receiving unit with respect to the optical axis. For this reason, in the embodiment, the configuration is employed in which the inclination of the light-projecting unit out of the light-projecting unit and the light-receiving unit can be adjusted. However, a configuration in which inclination adjustment is possible may also be applied to the light-receiving unit.

An access opening 88A and an access opening 88B are formed at the second intermediate plate 68. Each of the access opening 88A and the access opening 88B is a through-hole penetrating the second intermediate plate 68 along the Y-axis. Additionally, as illustrated in FIG. 17, an access opening 89A and an access opening 89B are formed at the second support plate 65. The access opening 88A and the access opening 88B illustrated in FIG. 20 respectively overlap the access opening 89A and the access opening 89B illustrated in FIG. 17 when viewed from the +Y direction.

Each of the access opening 88A and the access opening 88B illustrated in FIG. 20 is formed at a position overlapping the screw 74 when viewed from the +Y direction. An opening area of each of the access opening 88A and the access opening 88B is larger than a projected area of the screw 74. An opening area of each of the access opening 89A and the access opening 89B illustrated in FIG. 17 is also larger than the projected area of the screw 74. When viewed from the +Y direction in a state where the second intermediate plate 68 illustrated in FIG. 20 is fixed to the second support plate 65 by the screw 81, the screws 74 are exposed through the access opening 88A and the access opening 88B. The screws 74 can be accessed by a tool such as a driver through the access opening 88A and the access opening 88B.

Figure 21:
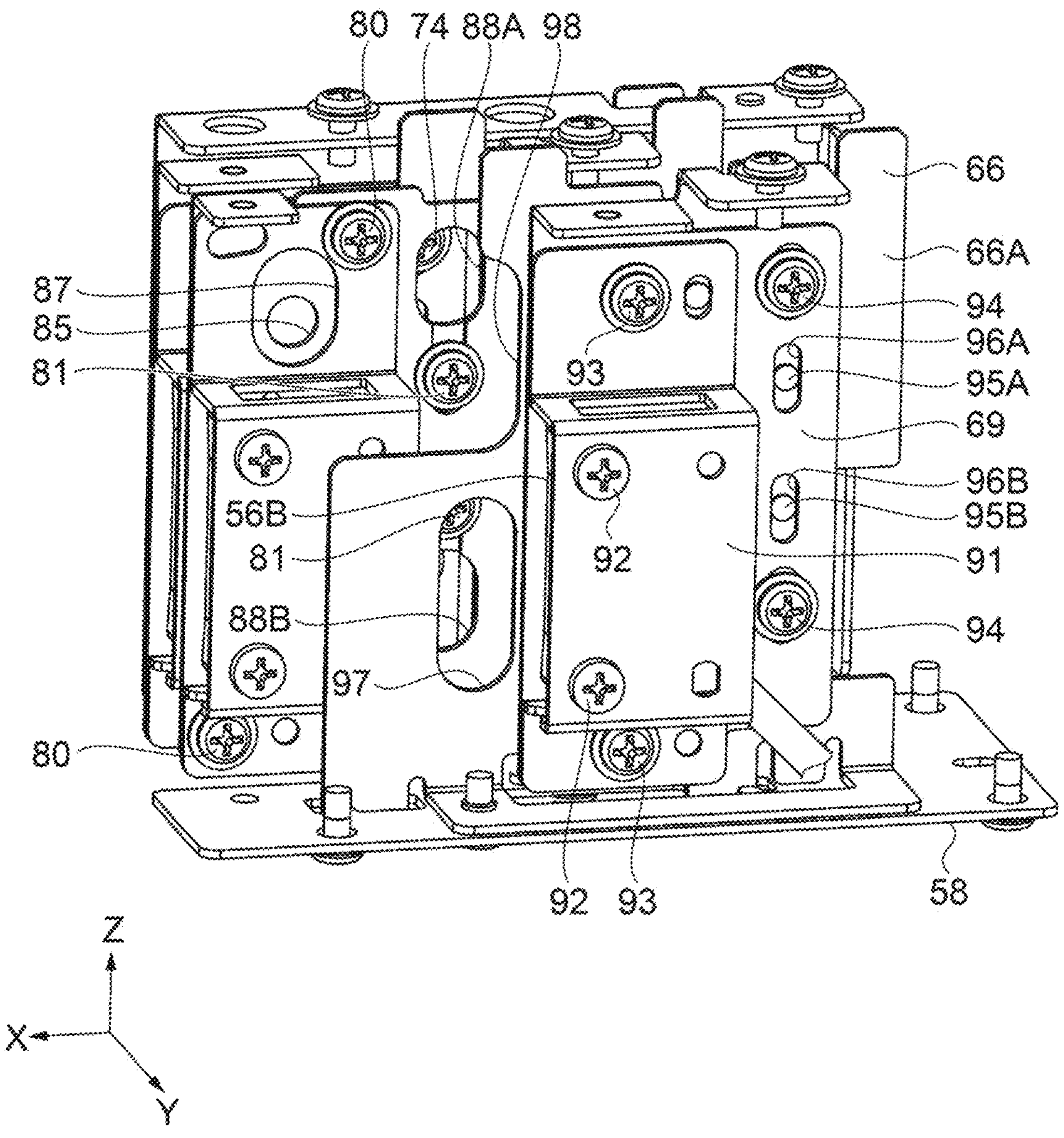
FIG. 21 is a perspective view for explaining an arrangement of the first light-receiving unit, the second light-projecting unit and the third light-receiving unit.

As illustrated in FIG. 21, the third light-receiving unit 56B is fixed to a third fixing plate 91 by a screw 92. The third fixing plate 91 is fixed to the third intermediate plate 69 by a screw 93. The third intermediate plate 69 is fixed to the third support plate 66 by a screw 94. When viewed from the +Y direction in this state, the third light-receiving unit 56B, the third fixing plate 91 and the third intermediate plate 69 are positioned in the −X direction from the screw 81, the access opening 88A and the access opening 88B. That is, when viewed from the +Y direction, the third light-receiving unit 56B, the third fixing plate 91 and the third intermediate plate 69 do not overlap the screw 81, the access opening 88A and the access opening 88B.

Further, the third support plate 66 does not overlap the screw 80, the center hole 85 and the adjustment hole 87 when viewed from the +Y direction. When viewed from the +Y direction, the screw 80, the center hole 85 and the adjustment hole 87 are positioned outside a contour of the third support plate 66. Therefore, when the third support plate 66 is viewed from the +Y direction, the screw 80, the center hole 85 and the adjustment hole 87 are exposed.

A protrusion 95A and a protrusion 95B are formed at the third support plate 66. The protrusion 95A and the protrusion 95B protrude in the +Y direction from a surface 66A along the XZ plane. The protrusion 95A and the protrusion 95B are aligned along the Z-axis. The protrusion 95A is positioned in the +Z direction of the protrusion 95B.

An elongated hole 96A and an elongated hole 96B are formed at the third intermediate plate 69. Each of the elongated hole 96A and the elongated hole 96B has an elongated shape along the Z-axis. The elongated hole 96A and the elongated hole 96B are formed at positions facing the protrusion 95A and the protrusion 95B, respectively. The elongated hole 96A and the elongated hole 96B are aligned along the Z-axis. The elongated hole 96A is positioned in the +Z direction of the elongated hole 96B. The third intermediate plate 69 can be lifted and lowered along the Z-axis in a state where the two screws 94 are loosened. At this time, since the elongated hole 96A and the elongated hole 96B are guided by the protrusion 95A and the protrusion 95B, the third intermediate plate 69 can be lifted and lowered along the Z-axis with high accuracy. Thus, a height position of the third light-receiving unit 56B with respect to the first base plate 58 can be adjusted.

An access opening 97 and a notch portion 98 are formed at the third support plate 66. The access opening 97 is a through-hole penetrating the third support plate 66 along the Y-axis. The access opening 97 is formed at a position overlapping the screw 81 and the access opening 88B when viewed from the +Y direction. An opening area of the access opening 97 is larger than a projected area of the screw 81 and the opening area of the access opening 88B. When the third support plate 66 is viewed from the +Y direction, the screw 81 and the access opening 88B are exposed through the access opening 97. The screw 81 can be accessed by a tool such as a driver through the access opening 97. Further, the screw 74 illustrated in FIG. 20 can be accessed with a tool such as a driver through the access opening 97 and the access opening 88B.

The notch portion 98 is formed at a position overlapping the screw 81 and the access opening 88A when viewed from the +Y direction. An opening area of the notch portion 98 is larger than the projected area of the screw 81 and an opening area of the access opening 88A. When the third support plate 66 is viewed from the +Y direction, the screw 81 and the access opening 88A are exposed through the notch portion 98. The screw 81 can be accessed by a tool such as a driver through the notch portion 98. In addition, the screw 74 can be accessed with a tool such as a driver through the notch portion 98 and the access opening 88A.

Figure 22:
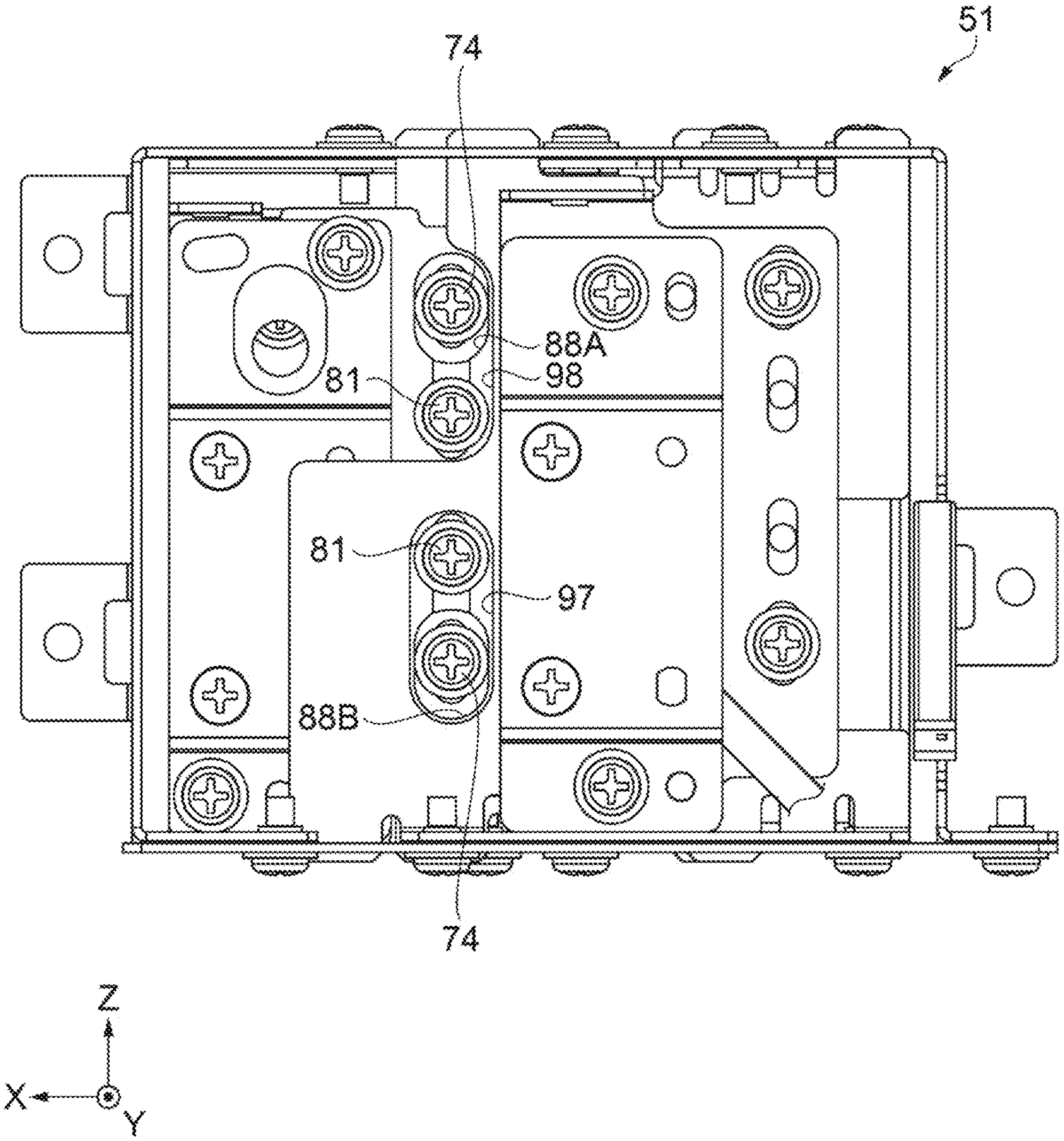
FIG. 22 is a front view illustrating the first unit.

According to the above configuration, as illustrated in FIG. 22, in first unit 51, the screw 81 can be accessed by a tool such as a driver through the access opening 97. In addition, the screw 74 can be accessed with a tool such as a driver through the access opening 97 and the access opening 88B. Similarly, the screw 81 can be accessed by a tool such as a driver through the notch portion 98. In addition, the screw 74 can be accessed with a tool such as a driver through the notch portion 98 and the access opening 88A.

Therefore, the first light-receiving unit 54B can be lifted and lowered in a state of the first unit 51. In addition, in the state of the first unit 51, the second light-projecting unit 55A can be lifted and lowered and the inclination thereof can be adjusted. Further, the third light-receiving unit 56B can be lifted and lowered in the state of the first unit 51.

Figure 23:
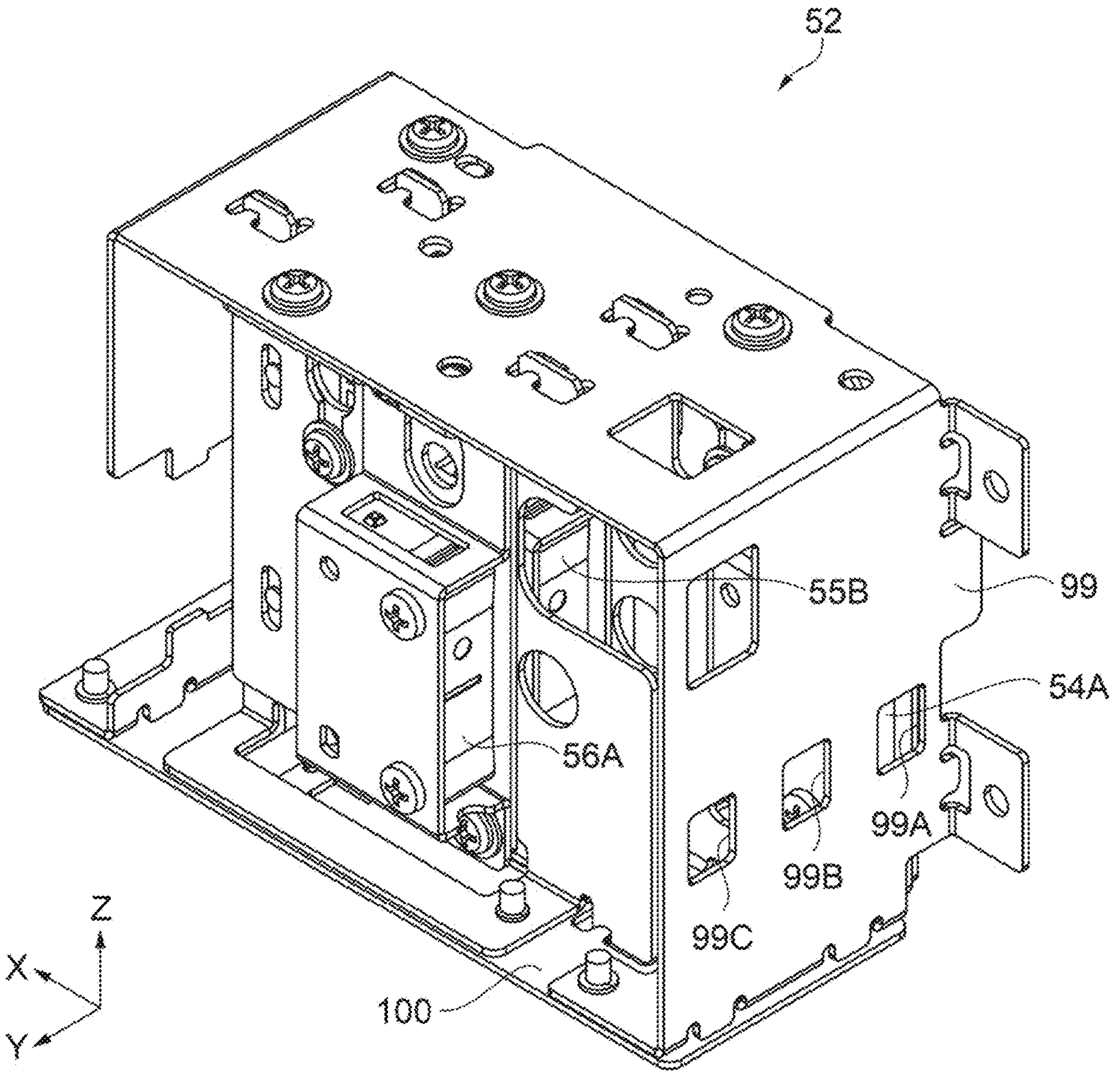
FIG. 23 is a perspective view illustrating a second unit.

As illustrated in FIG. 23, the second unit 52 includes a second case 99 and a second base plate 100. The second case 99 accommodates the first light-projecting unit 54A, the second light-receiving unit 55B and the third light-projecting unit 56A. The second base plate 100 is a plate that supports the first light-projecting unit 54A, the second light-receiving unit 55B and the third light-projecting unit 56A. The second case 99 is fixed to the second base plate 100 with a screw. At a side surface in the −X direction of the second case 99, a fourth optical axis opening 99A, a fifth optical axis opening 99B and a sixth optical axis opening 99C are formed. The fourth optical axis opening 99A is a path of light projected from the first light-projecting unit 54A. The fifth optical axis opening 99B is a path of light projected to the second light-receiving unit 55B. The sixth optical axis opening 99C is a path of light projected from the third light-projecting unit 56A.

Figure 24:
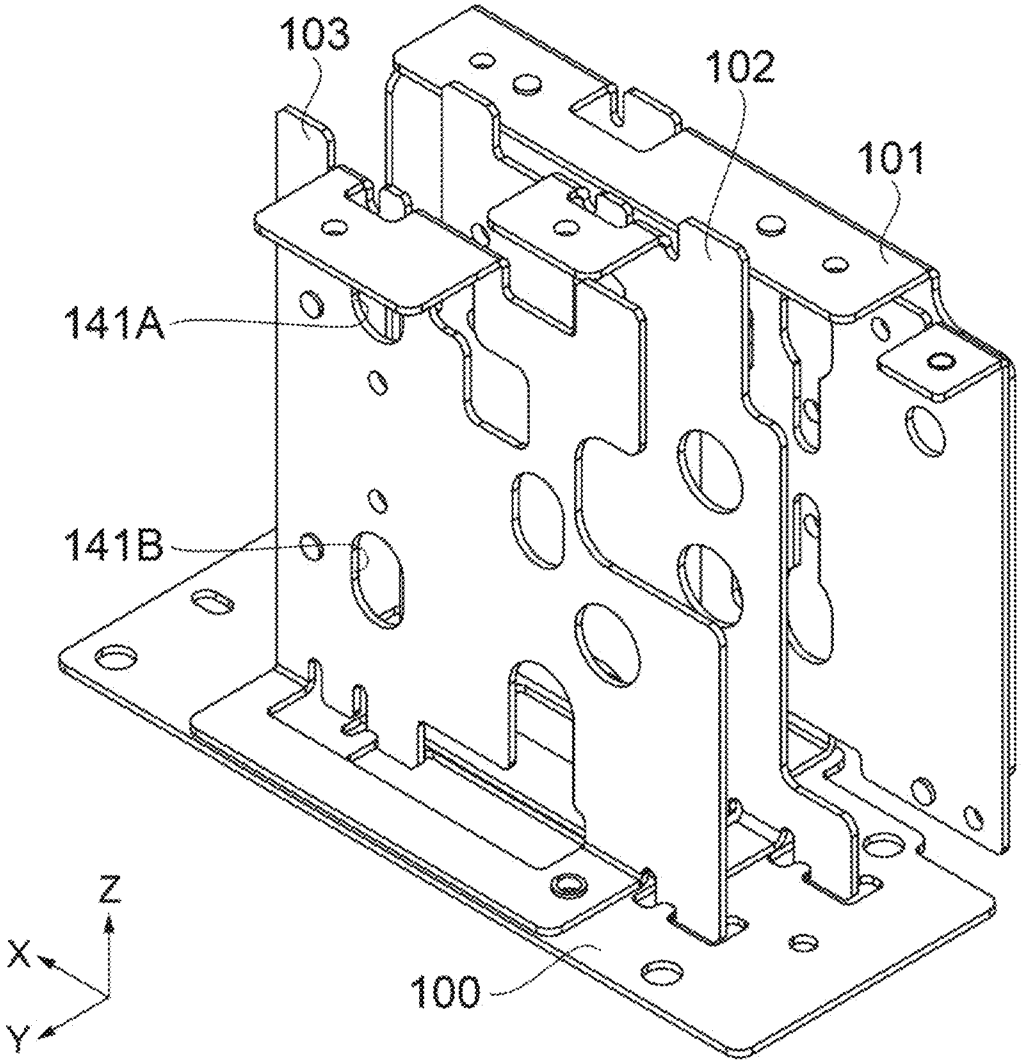
FIG. 24 is a perspective view illustrating a second base plate, a fourth support plate, a fifth support plate and a sixth support plate.
Figure 25:
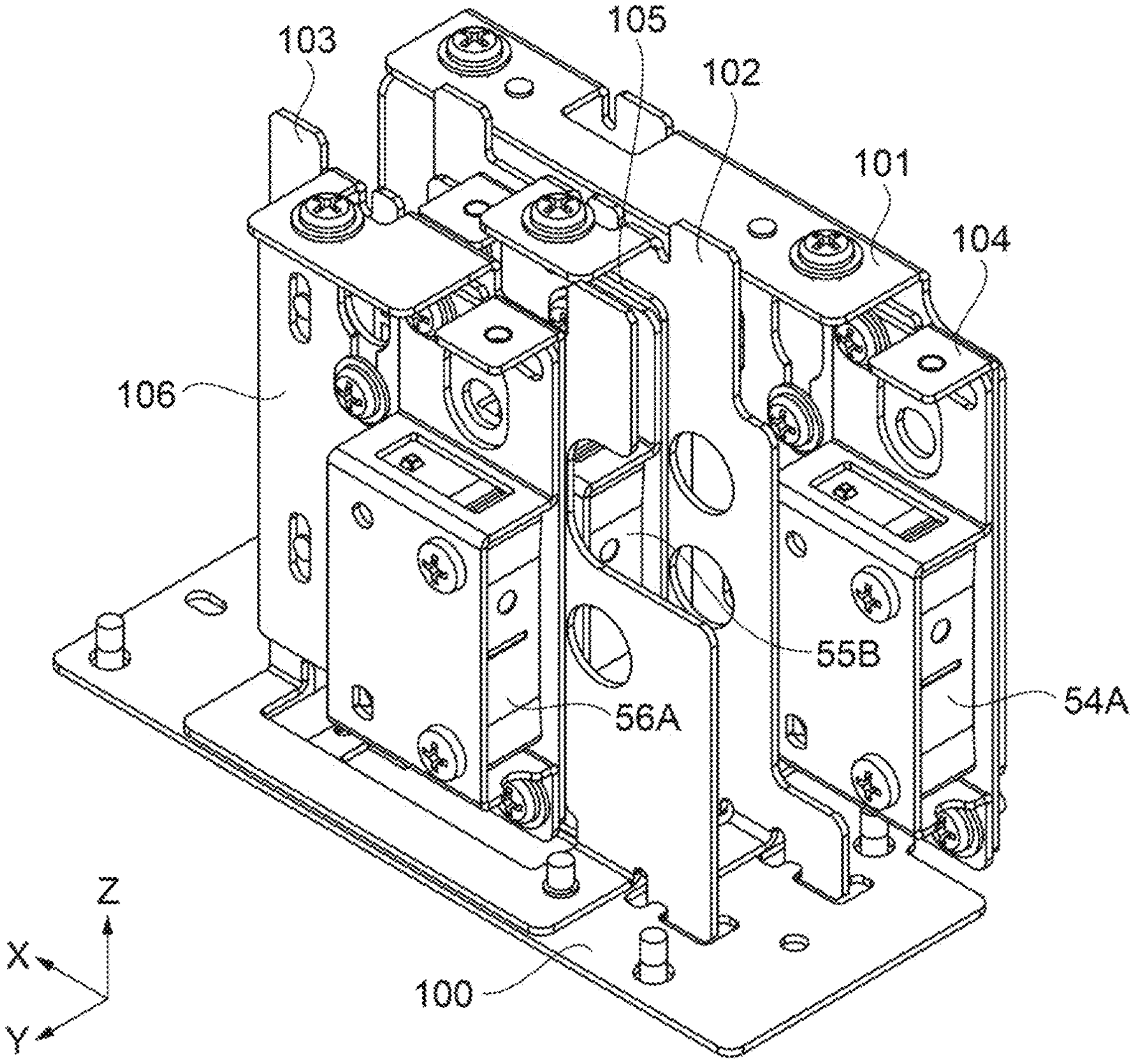
FIG. 25 is a perspective view for explaining fixing of a first light-projecting unit, a second light-receiving unit and a third light-projecting unit.

As illustrated in FIG. 24, a fourth support plate 101, a fifth support plate 102 and a sixth support plate 103 are fixed to the second base plate 100 with screws. Each of the fourth support plate 101, the fifth support plate 102 and the sixth support plate 103 has a surface along the XZ plane. As illustrated in FIG. 25, the first light-projecting unit 54A is supported by the fourth support plate 101 through a fourth intermediate plate 104. The second light-receiving unit 55B is supported by the fifth support plate 102 through a fifth intermediate plate 105. The third light-projecting unit 56A is supported by the sixth support plate 103 through a sixth intermediate plate 106.

Figure 26:
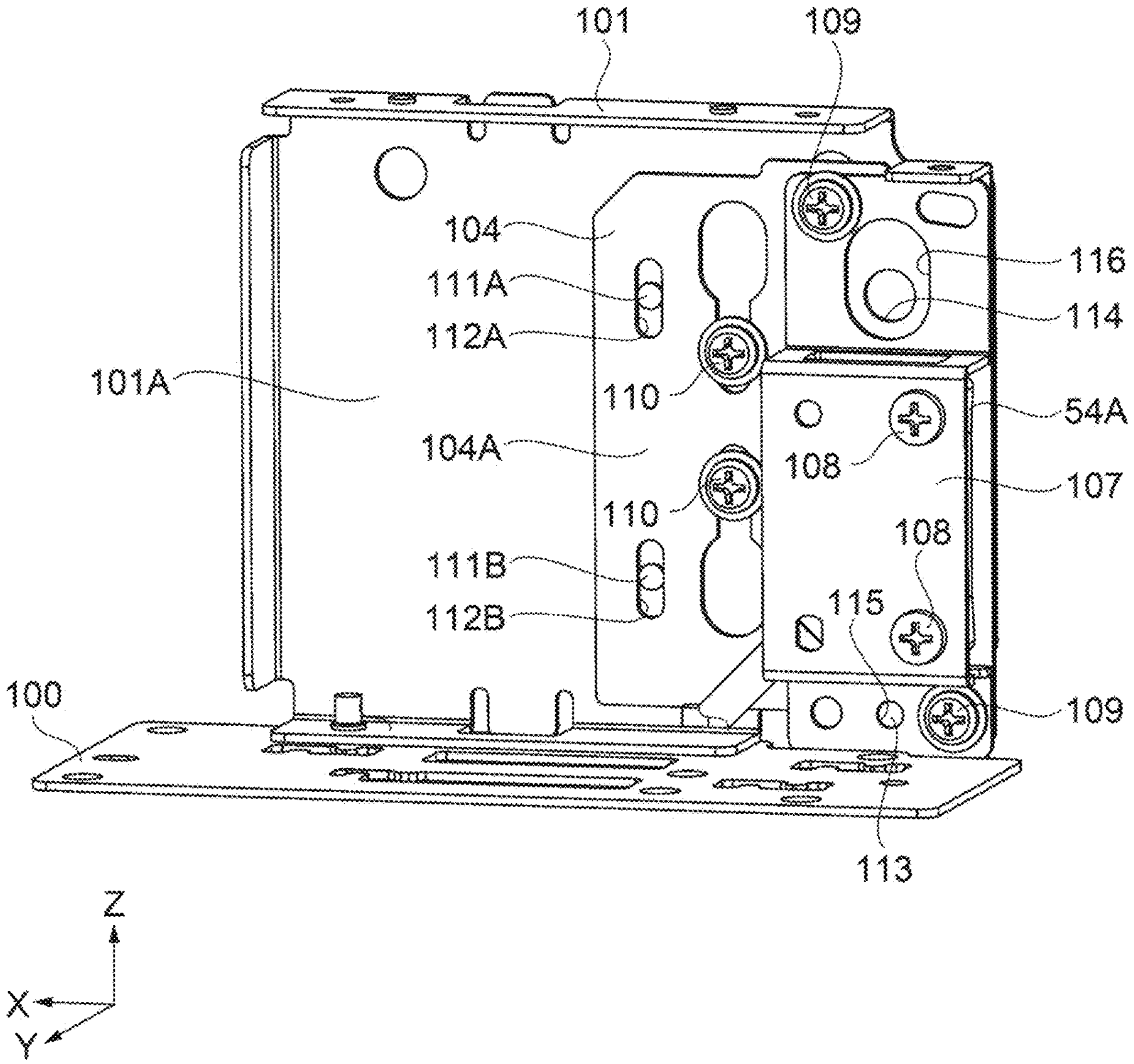
FIG. 26 is a perspective view illustrating fixing of the first light-projecting unit.

As illustrated in FIG. 26, the first light-projecting unit 54A is fixed to a fourth fixing plate 107 by a screw 108. The fourth fixing plate 107 is fixed to the fourth intermediate plate 104 by a screw 109. The fourth intermediate plate 104 is fixed to the fourth support plate 101 by a screw 110. A protrusion 111A and a protrusion 111B are formed at the fourth support plate 101. The protrusion 111A and the protrusion 111B protrude in the +Y direction from a surface 101A along the XZ plane. The protrusion 111A and the protrusion 111B are aligned along the Z-axis. The protrusion 111A is positioned in the +Z direction of the protrusion 111B.

An elongated hole 112A and an elongated hole 112B are formed at the fourth intermediate plate 104. Each of the elongated hole 112A and the elongated hole 112B has an elongated shape along the Z-axis. The elongated hole 112A and the elongated hole 112B are formed at positions facing the protrusion 111A and the protrusion 111B, respectively. The elongated hole 112A and the elongated hole 112B are aligned along the Z-axis. The elongated hole 112A is positioned in the +Z direction of the elongated hole 112B. The fourth intermediate plate 104 can be lifted and lowered along the Z-axis in a state where the two screws 110 are loosened. At this time, since the elongated hole 112A and the elongated hole 112B are guided by the protrusion 111A and the protrusion 111B, the fourth intermediate plate 104 can be lifted and lowered along the Z-axis with high accuracy. Accordingly, a height position of the first light-projecting unit 54A with respect to the second base plate 100 can be adjusted.

A protrusion 113 and a center hole 114 are formed at the fourth intermediate plate 104. The protrusion 113 protrudes in the +Y direction from a surface 104A along the XZ plane. The center hole 114 is opened at the surface 104A. The center hole 114 is positioned in the +Z direction of the protrusion 113. A fitting hole 115 and an adjustment hole 116 are formed at the fourth fixing plate 107. The protrusion 113 is inserted into the fitting hole 115. An opening area of the adjustment hole 116 is larger than an opening area of the center hole 114. When the fourth fixing plate 107 is fixed to the fourth intermediate plate 104 by the screw 109 in a state where the protrusion 113 is inserted into the fitting hole 115, the center hole 114 overlaps the adjustment hole 116. In this state, the center hole 114 is exposed through the adjustment hole 116.

When the screw 109 is loosened, an inclination of the fourth fixing plate 107 can be changed with the protrusion 113 as a center. It is possible to change the inclination of the fourth fixing plate 107 with fine accuracy by inserting a jig having a structure in which two columns having different diameters are eccentrically overlapped into the center hole 114 and the adjustment hole 116, and rotating the jig around the center hole 114. Accordingly, an inclination of the first light-projecting unit 54A with respect to the XY plane can be adjusted.

Figure 27:
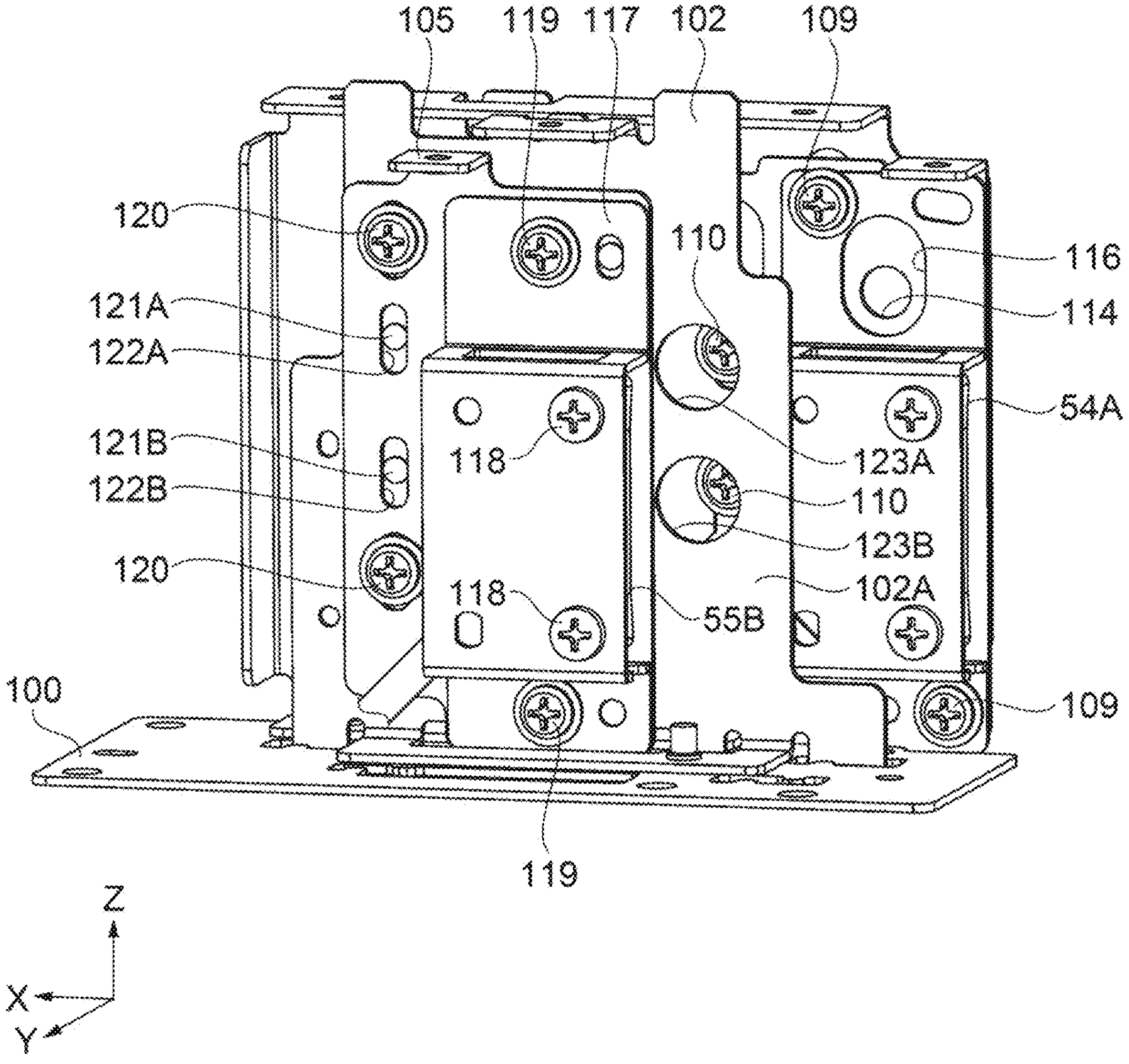
FIG. 27 is a perspective view for explaining fixing of the first light-projecting unit and the second light-receiving unit.

As illustrated in FIG. 27, the second light-receiving unit 55B is fixed to a fifth fixing plate 117 by a screw 118. The fifth fixing plate 117 is fixed to the fifth intermediate plate 105 by a screw 119. The fifth intermediate plate 105 is fixed to the fifth support plate 102 by a screw 120. When viewed from the +Y direction in this state, the second light-receiving unit 55B, the fifth fixing plate 117 and the fifth intermediate plate 105 are positioned in the +X direction from the screw 109. That is, when viewed from the +Y direction, the second light-receiving unit 55B, the fifth fixing plate 117 and the fifth intermediate plate 105 do not overlap the screw 109.

Further, the fifth support plate 102 does not overlap the screw 109, the center hole 114, and the adjustment hole 116 when viewed from the +Y direction. When viewed from the +Y direction, the screw 109, the center hole 114 and the adjustment hole 116 are positioned outside a contour of the fifth support plate 102. Therefore, when the fifth support plate 102 is viewed from the +Y direction, the screw 109, the center hole 114 and the adjustment hole 116 are exposed. Therefore, it is possible to adjust the inclination of the first light-projecting unit 54A with respect to the XY plane in a state where the fifth support plate 102 is fixed to the second base plate 100.

A protrusion 121A and a protrusion 121B are formed at the fifth support plate 102. The protrusion 121A and the protrusion 121B protrude in the +Y direction from a surface 102A along the XZ plane. The protrusion 121A and the protrusion 121B are aligned along the Z-axis. The protrusion 121A is positioned in the +Z direction of the protrusion 121B.

An elongated hole 122A and an elongated hole 122B are formed at the fifth intermediate plate 105. Each of the elongated hole 122A and the elongated hole 122B has an elongated shape along the Z-axis. The elongated hole 122A and the elongated hole 122B are formed at positions facing the protrusion 121A and the protrusion 121B, respectively. The elongated hole 122A and the elongated hole 122B are aligned along the Z-axis. The elongated hole 122A is positioned in the +Z direction of the elongated hole 122B. The fifth intermediate plate 105 can be lifted and lowered along the Z-axis in a state where the two screws 120 are loosened. At this time, since the elongated hole 122A and the elongated hole 122B are guided by the protrusion 121A and the protrusion 121B, the fifth intermediate plate 105 can be lifted and lowered along the Z-axis with high accuracy. Thus, a height position of the second light-receiving unit 55B with respect to the second base plate 100 can be adjusted.

An access opening 123A and an access opening 123B are formed at the fifth support plate 102. Each of the access opening 123A and the access opening 123B is a through-hole penetrating the fifth support plate 102 along the Y-axis. Each of the access opening 123A and the access opening 123B is formed at a position overlapping the screw 110 when viewed from the +Y direction. An opening area of each of the access opening 123A and the access opening 123B is larger than a projected area of the screw 110. When the fifth support plate 102 is viewed from the +Y direction, the screws 110 are exposed through the access opening 123A and the access opening 123B. The screws 110 can be accessed by a tool such as a driver through the access opening 123A and the access opening 123B. Therefore, in a state where the fifth support plate 102 is fixed to the second base plate 100, the height position of the first light-projecting unit 54A with respect to the second base plate 100 can be adjusted.

Figure 28:
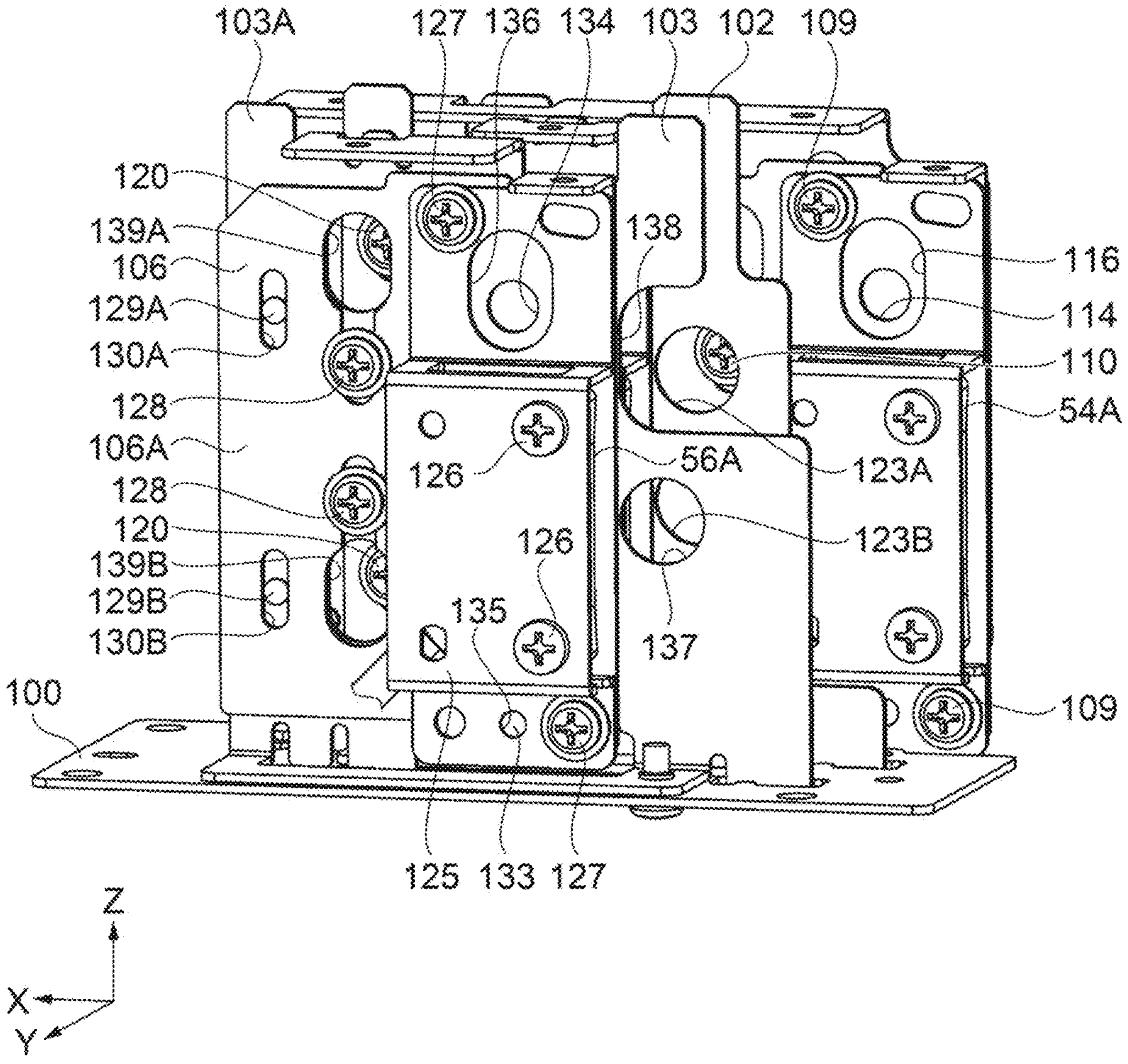
FIG. 28 is a perspective view for explaining an arrangement of the first light-projecting unit, the second light-receiving unit and the third light-projecting unit.

As illustrated in FIG. 28, the third light-projecting unit 56A is fixed to a sixth fixing plate 125 by a screw 126. The sixth fixing plate 125 is fixed to the sixth intermediate plate 106 by a screw 127. The sixth intermediate plate 106 is fixed to the sixth support plate 103 by a screw 128. When viewed from the +Y direction in this state, the third light-projecting unit 56A, the sixth fixing plate 125 and the sixth intermediate plate 106 are positioned in the +X direction from the screw 109. That is, when viewed from the +Y direction, the third light-projecting unit 56A, the sixth fixing plate 125 and the sixth intermediate plate 106 do not overlap the screw 109.

Further, the sixth support plate 103 does not overlap the screw 109, the center hole 114 and the adjustment hole 116 when viewed from the +Y direction. When viewed from the +Y direction, the screw 109, the center hole 114 and the adjustment hole 116 are positioned outside a contour of the sixth support plate 103. Therefore, when the sixth support plate 103 is viewed from the +Y direction, the screw 109, the center hole 114 and the adjustment hole 116 are exposed. Therefore, it is possible to adjust the inclination of the first light-projecting unit 54A with respect to the XY plane in a state where the sixth support plate 103 is fixed to the second base plate 100.

A protrusion 129A and a protrusion 129B are formed at the sixth support plate 103. The protrusion 129A and the protrusion 129B protrude in the +Y direction from a surface 103A along the XZ plane. The protrusion 129A and the protrusion 129B are aligned along the Z-axis. The protrusion 129A is positioned in the +Z direction of the protrusion 129B.

An elongated hole 130A and an elongated hole 130B are formed at the sixth intermediate plate 106. Each of the elongated hole 130A and the elongated hole 130B has an elongated shape along the Z-axis. The elongated hole 130A and the elongated hole 130B are formed at positions facing the protrusion 129A and the protrusion 129B, respectively. The elongated hole 130A and the elongated hole 130B are aligned along the Z-axis. The elongated hole 130A is positioned in the +Z direction of the elongated hole 130B. The sixth intermediate plate 106 can be lifted and lowered along the Z-axis in a state where the two screws 128 are loosened. At this time, since the elongated hole 130A and the elongated hole 130B are guided by the protrusion 129A and the protrusion 129B, the sixth intermediate plate 106 can be lifted and lowered along the Z-axis with high accuracy. Accordingly, a height position of the third light-projecting unit 56A with respect to the second base plate 100 can be adjusted.

A protrusion 133 and a center hole 134 are formed at the sixth intermediate plate 106. The protrusion 133 protrudes in the +Y direction from a surface 106A along the XZ plane. The center hole 134 is opened at the surface 106A. The center hole 134 is positioned in the +Z direction of the protrusion 133. A fitting hole 135 and an adjustment hole 136 are formed at the sixth fixing plate 125. The protrusion 133 is inserted into the fitting hole 135. An opening area of the adjustment hole 136 is larger than an opening area of the center hole 134. When the sixth fixing plate 125 is fixed to the sixth intermediate plate 106 by the screw 127 in a state where the protrusion 133 is inserted into the fitting hole 135, the center hole 134 overlaps the adjustment hole 136. In this state, the center hole 134 is exposed through the adjustment hole 136.

When the screw 127 is loosened, an inclination of the sixth fixing plate 125 can be changed with the protrusion 133 as a center. It is possible to change the inclination of the sixth fixing plate 125 with fine accuracy by inserting a jig having a structure in which two columns having different diameters are eccentrically overlapped into the center hole 134 and the adjustment hole 136, and rotating the jig around the center hole 134. Accordingly, it is possible to adjust an inclination of the third light-projecting unit 56A with respect to the XY plane.

An access opening 137 and a notch portion 138 are formed at the sixth support plate 103. The access opening 137 is a through-hole penetrating the sixth support plate 103 along the Y-axis. The access opening 137 is formed at a position overlapping the screw 110 and the access opening 123B illustrated in FIG. 27 when viewed from the +Y direction. An opening area of the access opening 137 is larger than the projected area of the screw 110. When the sixth support plate 103 is viewed from the +Y direction, the screw 110 is exposed through the access opening 123B and the access opening 137. The screw 110 illustrated in FIG. 27 can be accessed with a tool such as a driver through the access opening 137 and the access opening 123B.

The notch portion 138 illustrated in FIG. 28 is formed at a position overlapping the screw 110 and the access opening 123A when viewed from the +Y direction. An opening area of the notch portion 138 is larger than the projected area of the screw 110 and an opening area of the access opening 123A. When the sixth support plate 103 is viewed from the +Y direction, the screw 110 and the access opening 123A are exposed through the notch portion 138. The screw 110 can be accessed by a tool such as a driver through the notch portion 138 and the access opening 123A.

An access opening 139A and an access opening 139B are formed at the sixth intermediate plate 106. Each of the access opening 139A and the access opening 139B is a through-hole penetrating the sixth intermediate plate 106 along the Y-axis. Additionally, as illustrated in FIG. 24, an access opening 141A and an access opening 141B are formed at the sixth support plate 103. The access opening 139A and the access opening 139B illustrated in FIG. 28 respectively overlap the access opening 141A and the access opening 141B illustrated in FIG. 24 when viewed from the +Y direction.

Each of the access opening 139A and the access opening 139B illustrated in FIG. 28 is formed at a position overlapping the screw 120 when viewed from the +Y direction. An opening area of each of the access opening 139A and the access opening 139B is larger than a projected area of the screw 120. An opening area of each of the access opening 141A and the access opening 141B illustrated in FIG. 24 is also larger than the projected area of the screw 120. When viewed from the +Y direction in a state where the sixth intermediate plate 106 illustrated in FIG. 28 is fixed to the sixth support plate 103 by the screw 128, the screws 120 are exposed through the access opening 139A and the access opening 139B. The screws 120 can be accessed by a tool such as a driver through the access opening 139A and the access opening 139B.

Figure 29:
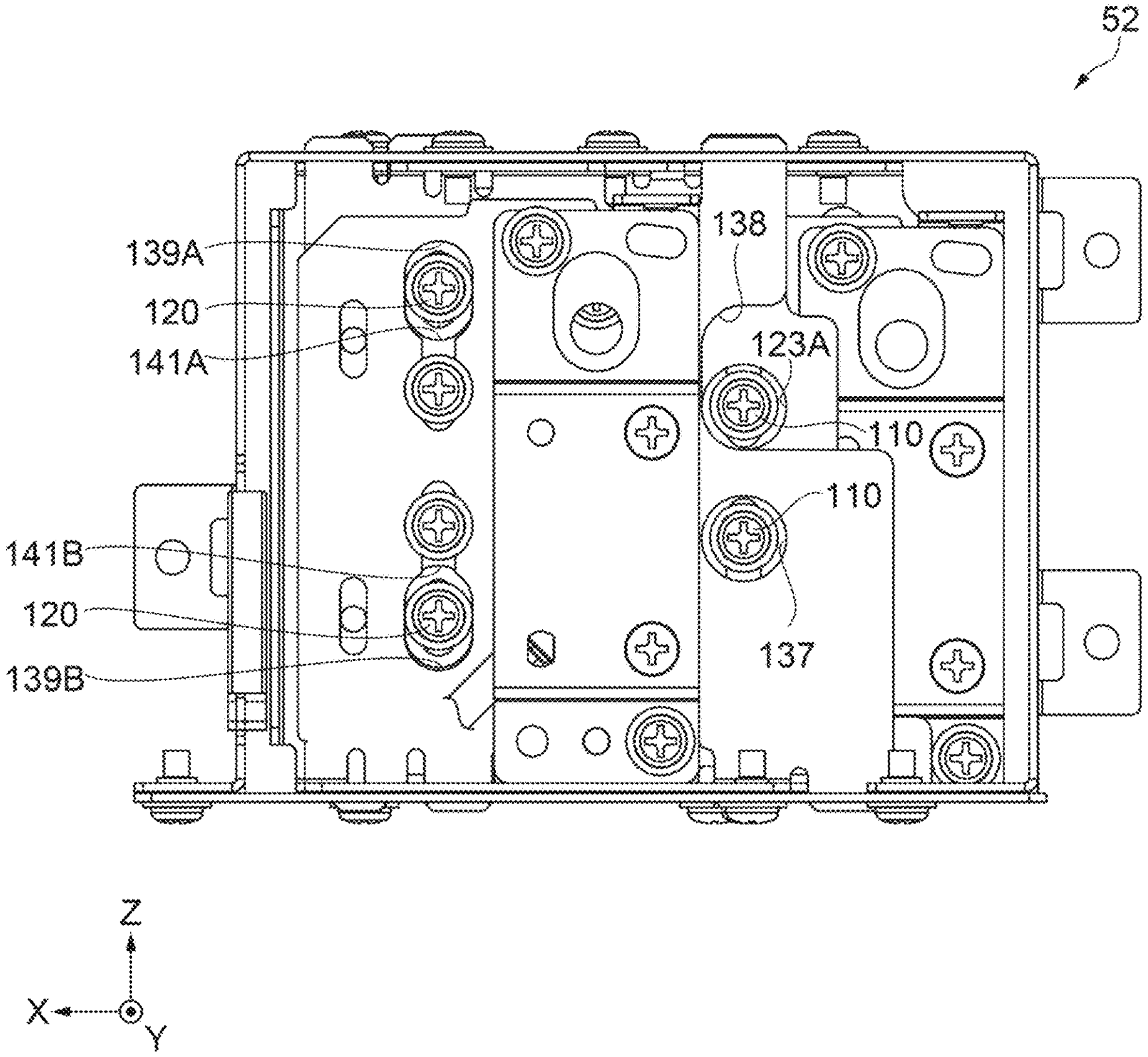
FIG. 29 is a front view illustrating the second unit.

According to the above configuration, as illustrated in FIG. 29, in the second unit 52, the screw 110 can be accessed by a tool such as a driver through the access opening 137. The screw 110 can be accessed by a tool such as a driver through the notch portion 138 and the access opening 123A. In addition, the screw 120 can be accessed with a tool such as a driver through the access opening 139A and the access opening 141A. Similarly, the screw 120 can be accessed with a tool such as a driver through the access opening 139B and the access opening 141B.

Thus, in the state of the second unit 52, the first light-projecting unit 54A can be lifted and lowered and the inclination of the first light-projecting unit 54A can be adjusted. In addition, the second light-receiving unit 55B can be lifted and lowered in the state of the second unit 52. Further, in the state of the second unit 52, the third light-projecting unit 56A can be lifted and lowered, and the inclination of the third light-projecting unit 56A can be adjusted.

Figure 30:
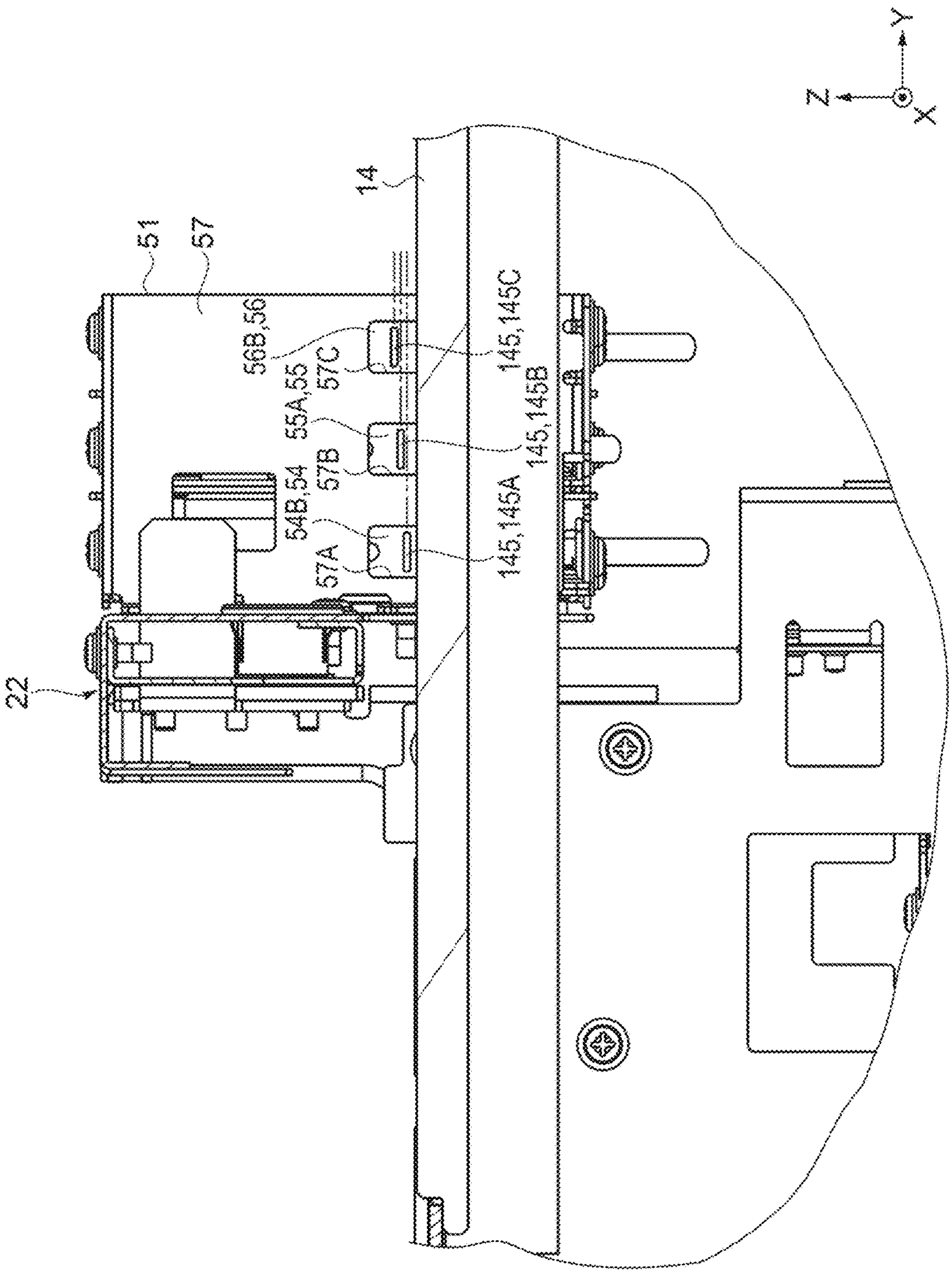
FIG. 30 is a cross-sectional view for explaining positions of an optical axis of a sensor unit and a tray.

FIG. 30 is a cross-sectional view illustrating the sensor unit 22 and the tray 14. FIG. 30 illustrates a cross section of the sensor unit 22 and the tray 14 cut along the YZ plane and viewed from the +X direction. FIG. 30 illustrates a side surface of the first unit 51. Further, FIG. 30 also illustrates positions of optical axes 145 of the first sensor set 54, the second sensor set 55 and the third sensor set 56. The optical axis 145 of the first sensor set 54 is identified as an optical axis 145A. The optical axis 145 of the second sensor set 55 is identified as an optical axis 145B. The optical axis 145 of the third sensor set 56 is identified as an optical axis 145C.

The optical axes 145A, 145B and 145C are different from each other in position along the Y-axis. The optical axis 145B is positioned in the +Y direction from the optical axis 145A. The optical axis 145C is positioned in the +Y direction from the optical axis 145B. The optical axes 145A, 145B and 145C are different from each other in height position along the Z-axis. The optical axis 145B is positioned in the +Z direction from the optical axis 145A. The optical axis 145C is positioned in the +Z direction from the optical axis 145B. Therefore, it is expressed that the optical axis 145A, the optical axis 145B and the optical axis 145C are arranged in a stepwise manner. Since the optical axis 145A, the optical axis 145B and the optical axis 145C are arranged in a stepwise manner, a thickness of a printing medium can be detected on a four-point scale. Accordingly, it is possible to perform print setting according to the scale of the thickness of the printing medium.

As an example of the print setting, it is possible to perform printing while changing a height of the tray 14 according to a scale of a thickness of a printing medium. As another example of the print setting, when the first sensor set 54 does not detect a printing medium, a user may be notified to check for presence of the printing medium. As another example of the print setting, when the third sensor set 56 detects a printing medium, the user can be notified that a printable thickness is exceeded. As another example of the print setting, when a thickness of a single printing medium varies partially, it is possible to perform printing while lifting or lowering the printing head 11 or the tray 14 in accordance with a thickness profile of the printing medium in the Y direction viewed from the X direction. Any of the above print setting is an example. Without being limited by these examples, various types of print setting can be applied according to a thickness of a printing medium.

As described above, the sensor unit 22 is attachable to and detachable from the frame unit 21 illustrated in FIG. 3. The sensor attachment component 53 is attachable to and detachable from the frame unit 21 in a state where the first sensor set 54, the second sensor set 55 and the third sensor set 56 are mounted at the sensor unit 22. The sensor unit 22 can be lifted and lowered along the Z-axis with reference to the reference point 29 set in the frame unit 21 through the first fixing member 24 and the second fixing member 25. Further, an inclination of the sensor unit 22 with respect to the XY plane can be adjusted through the first fixing member 24 and the second fixing member 25.

A height position of the optical axis 145A of the first sensor set 54 with respect to the frame unit 21 is determined with reference to the reference point 29 illustrated in FIG. 6. A height position of the optical axis 145B of the second sensor set 55 with respect to the frame unit 21 is also determined with reference to the reference point 29. A height position of the optical axis 145C of the third sensor set 56 with respect to the frame unit 21 is also determined with reference to the reference point 29. The reference point 29 is also a reference for a height position of the printing head 11. Therefore, it is possible to determine a height position of the optical axis of each of the first sensor set 54, the second sensor set 55 and the third sensor set 56 with respect to the printing head 11 with high accuracy. Thus, high printing quality of the printing apparatus 1 can be maintained.

According to the printing apparatus 1, the first sensor set 54, the second sensor set 55 and the third sensor set 56 are attached to the sensor attachment component 53. By attaching the sensor attachment component 53 to the printing apparatus 1, the first sensor set 54, the second sensor set 55 and the third sensor set 56 can be collectively attached to the printing apparatus 1. Accordingly, when the first sensor set 54, the second sensor set 55 and the third sensor set 56 are attached to the printing apparatus 1, it is easy to avoid adjusting positional accuracy and posture accuracy among the first sensor set 54, the second sensor set 55 and the third sensor set 56. As a result, it is easy to attach the first sensor set 54, the second sensor set 55 and the third sensor set 56 to the printing apparatus 1. In addition, replacement of the first sensor set 54, the second sensor set 55 and the third sensor set 56 is facilitated.

In addition, before the sensor unit 22 is attached to the printing apparatus 1, the first sensor set 54, the second sensor set 55 and the third sensor set 56 may be attached to the sensor attachment component 53 and a position and posture thereof may be adjusted. By adjusting the position and the posture of the sensor unit 22 with respect to the printing apparatus 1 using the first fixing member 24 and the second fixing member 25, the sensor attachment component 53 to which the first sensor set 54, the second sensor set 55 and the third sensor set 56 are attached is simply attached to the printing apparatus 1 so as to be in a usable state. By first adjusting positions and posture of the first fixing member 24 and the second fixing member 25 with respect to the reference points 29, after the adjustment of the first fixing member 24 and the second fixing member 25, the position and the posture of the sensor unit 22 with respect to the printing apparatus 1 are determined only by replacing the sensor attachment component 53 to which the first sensor set 54, the second sensor set 55 and the third sensor set 56 are attached. Therefore, it is easy to adjust the sensor unit 22.

According to the printing apparatus 1, the sensor attachment component 53 can be supported by the first frame 26 and the second frame 27 through the first fixing member 24 and the second fixing member 25.

According to the printing apparatus 1, the position of the sensor attachment component 53 with respect to the first frame 26 and the second frame 27 can be changed.

According to the printing apparatus 1, an orientation of the sensor attachment component 53 with respect to the first frame 26 and the second frame 27 can be changed.

According to the printing apparatus 1, it is possible to determine a position of the sensor attachment component 53 with respect to the position of the printing head 11 with reference to the reference points 29 of the first frame 26 and the second frame 27.

According to the printing apparatus 1, the first sensor set 54, the second sensor set 55 and the third sensor set 56 can be replaced together with the sensor attachment component 53. In the printing apparatus 1, the sensor unit 22 can be replaced with a new sensor unit 22 while the first fixing member 24 and the second fixing member 25 are fixed to the first frame 26 and the second frame 27.

According to the printing apparatus 1, a printing medium supported by the tray 14 can be detected by the optical sensor including the light-projecting unit and the light-receiving unit. In addition, according to the printing apparatus 1, since the optical sensor in which the light-projecting unit and the light-receiving unit are separate bodies is unitized by the sensor attachment component 53, attachment to the printing apparatus 1 is easy.

According to the printing apparatus 1, a printing medium supported by the tray 14 can be detected by the first sensor set 54, the second sensor set 55 and the third sensor set 56.

What is claimed is:

1. A printing apparatus, comprising:

a medium support portion configured to support a medium;

a head configured to eject ink onto the medium supported by the medium support portion;

a first sensor configured to detect the medium supported by the medium support portion;

a second sensor configured to detect the medium supported by the medium support portion; and a sensor attachment component to which the first sensor and the second sensor are attached, wherein the first sensor and the second sensor each include a light-projecting unit and a light-receiving unit facing each other with a space in a facing direction, which intersects with a medium passing direction along which the medium support portion passes the medium interposed therebetween, and the sensor attachment component is attachable and detachable with the first sensor and the second sensor attached by using a screw.

2. The printing apparatus according to claim 1, further comprising:

a frame configured to support the sensor attachment component; and a fixing plate configured to fix the sensor attachment component to the frame.

3. The printing apparatus according to claim 2, wherein a position of the sensor attachment component with respect to the frame is changeable by changing a position of the fixing plate with respect to the frame.

4. The printing apparatus according to claim 2, wherein an orientation of the sensor attachment component with respect to the frame is changeable by changing an orientation of the fixing plate with respect to the frame.

5. The printing apparatus according to claim 2, wherein the frame includes a reference portion serving as a reference of a position of the head with respect to the frame, and a position of the sensor attachment component with respect to the frame is determined through the fixing plate with reference to the reference portion.

6. The printing apparatus according to claim 2, wherein the sensor attachment component is attachable to and detachable from the fixing plate in a state where the fixing plate is fixed to the frame.

7. The printing apparatus according to claim 1, wherein the light-projecting unit of the first sensor is positioned on one side with respect to the space, and the light-projecting unit of the second sensor is positioned on another side opposite to the one side with respect to the space.

8. The printing apparatus according to claim 1, further comprising a third sensor configured to detect the medium supported by the medium support portion, wherein the third sensor is attached to the sensor attachment component.

9. A printing apparatus, comprising:

a medium support portion configured to support a medium;

a head configured to eject ink onto the medium supported by the medium support portion;

a first sensor configured to detect the medium supported by the medium support portion;

a second sensor configured to detect the medium supported by the medium support portion;

a sensor attachment component to which the first sensor and the second sensor are attached;

a frame configured to support the sensor attachment component; and a fixing plate configured to fix the sensor attachment component to the frame, wherein the first sensor and the second sensor each include a light-projecting unit and a light-receiving unit facing each other with a space, through which the medium support portion passes, interposed therebetween, the sensor attachment component is attachable and detachable with the first sensor and the second sensor attached by using a screw, the frame includes a reference portion serving as a reference of a position of the head with respect to the frame, and a position of the sensor attachment component with respect to the frame is determined through the fixing plate with reference to the reference portion.

10. The printing apparatus according to claim 9, wherein a position of the sensor attachment component with respect to the frame is changeable by changing a position of the fixing plate with respect to the frame.

11. The printing apparatus according to claim 9, wherein an orientation of the sensor attachment component with respect to the frame is changeable by changing an orientation of the fixing plate with respect to the frame.

12. The printing apparatus according to claim 9, wherein the sensor attachment component is attachable to and detachable from the fixing plate in a state where the fixing plate is fixed to the frame.

13. The printing apparatus according to claim 9, wherein the light-projecting unit of the first sensor is positioned on one side with respect to the space, and the light-projecting unit of the second sensor is positioned on another side opposite to the one side with respect to the space.

14. The printing apparatus according to claim 9, further comprising a third sensor configured to detect the medium supported by the medium support portion, wherein the third sensor is attached to the sensor attachment component.

* * * * *